United States Patent
Miura et al.

(10) Patent No.: US 7,502,285 B2
(45) Date of Patent: Mar. 10, 2009

(54) INFORMATION RECORDING APPARATUS AND METHOD, AND COMPUTER PROGRAM FOR RECORDING CONTROL

(75) Inventors: Masahiro Miura, Tokorozawa (JP); Masahiro Kato, Tokorozawa (JP); Shoji Taniguchi, Tokorozawa (JP); Kazuo Kuroda, Tokorozawa (JP)

(73) Assignee: Pioneeer Corporation, Tokyo (JP)

( * ) Notice: Subject to any disclaimer, the term of this patent is extended or adjusted under 35 U.S.C. 154(b) by 343 days.

(21) Appl. No.: 10/589,483

(22) PCT Filed: Oct. 7, 2005

(86) PCT No.: PCT/JP2005/018625

§ 371 (c)(1),
(2), (4) Date: Aug. 15, 2006

(87) PCT Pub. No.: WO2006/038689

PCT Pub. Date: Apr. 13, 2006

(65) Prior Publication Data

US 2007/0177472 A1    Aug. 2, 2007

(30) Foreign Application Priority Data

Oct. 7, 2004  (JP)  ............................. 2004-294712
Jan. 14, 2005 (JP)  ............................. 2005-008474

(51) Int. Cl.
*G11B 21/08* (2006.01)
(52) U.S. Cl. .................. 369/30.27; 369/53.12; 369/94
(58) Field of Classification Search .................. None
See application file for complete search history.

(56) References Cited

FOREIGN PATENT DOCUMENTS

| JP | 2000-311346 | 11/2000 |
|----|-------------|---------|
| JP | 2001-23237  | 1/2001  |
| WO | WO 00/23990 | 4/2000  |
| WO | WO 00/62286 | 10/2000 |

*Primary Examiner*—Paul Huber
(74) *Attorney, Agent, or Firm*—Young & Thompson

(57) ABSTRACT

An information recording device is used for recording record information in an information recording medium at least including a first recording layer capable of forming a first recording area and a second recording layer capable of forming a second recording area. The information recording device includes: write elements; acquisition elements for acquiring offset information indicating a relative shift; calculation elements for calculating an address ("Y'=Inv Y−α") indicating a second boundary point opposing to a first boundary point according to the offset information; and control elements for controlling the write elements so as to write record information (i) while making the first boundary point a recording end or start position and (ii) making the second boundary point indicated by the calculated address a recording start or end position.

15 Claims, 15 Drawing Sheets

[FIG. 1]
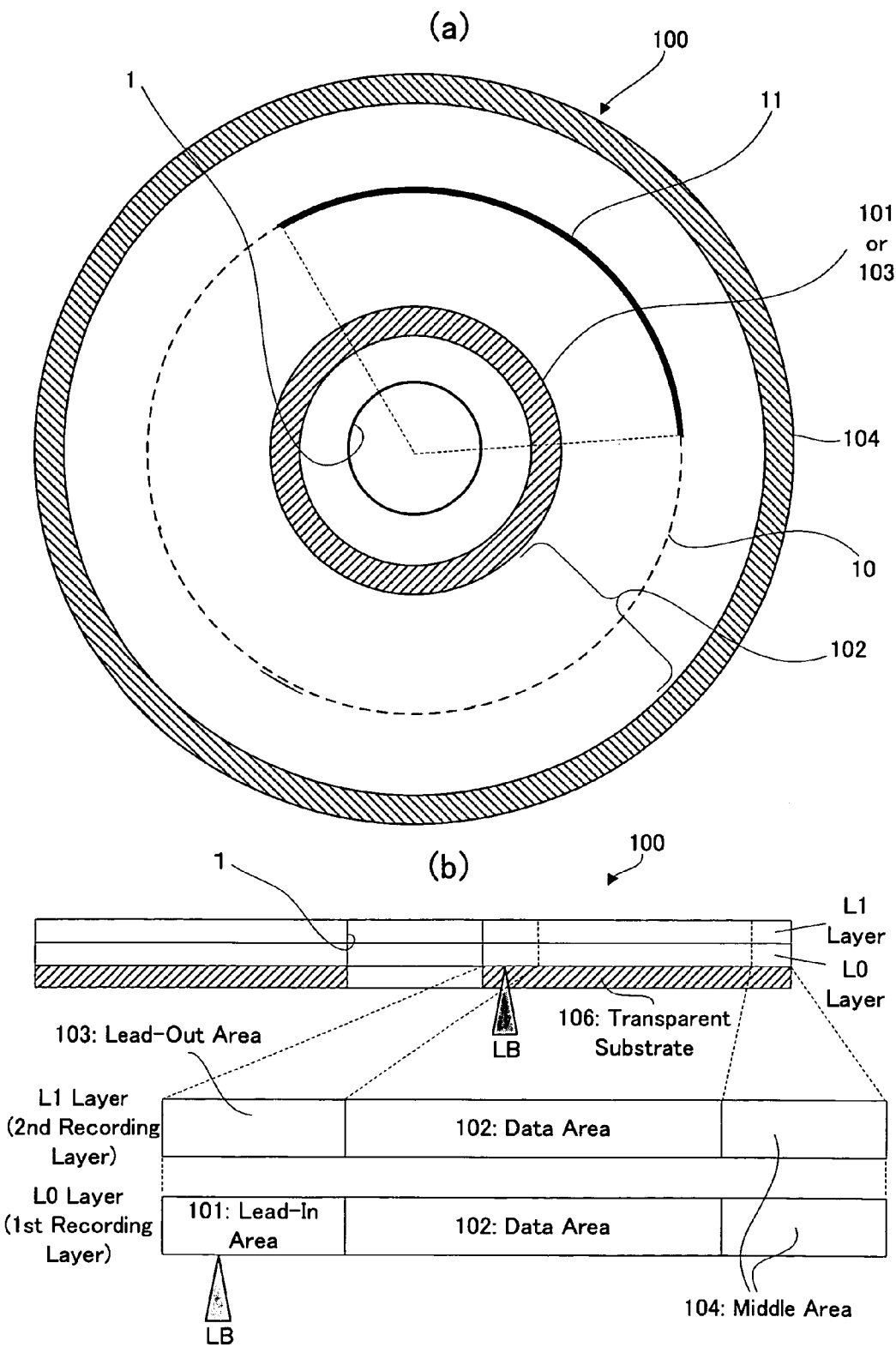

[FIG. 2]
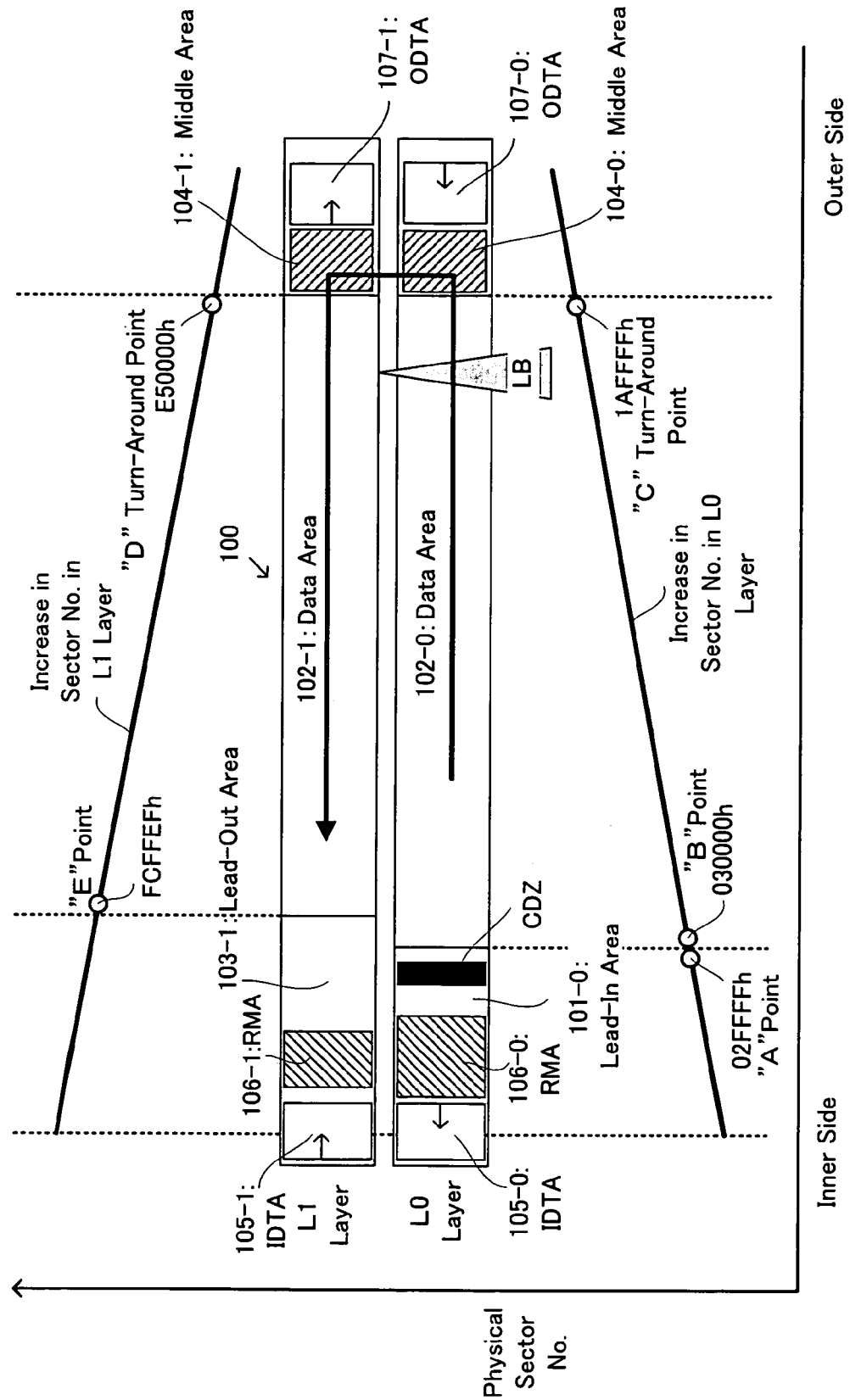

[FIG. 3]
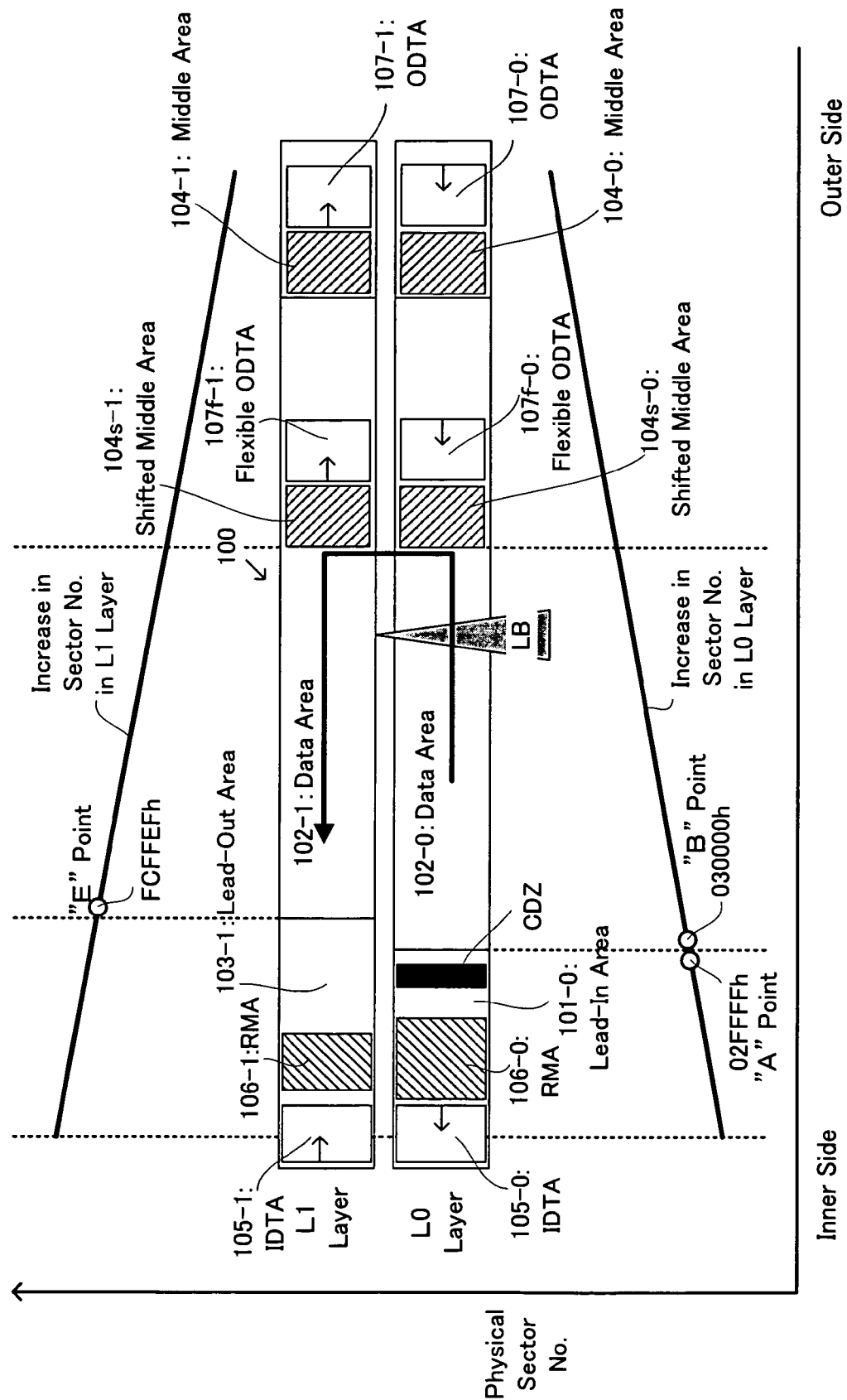

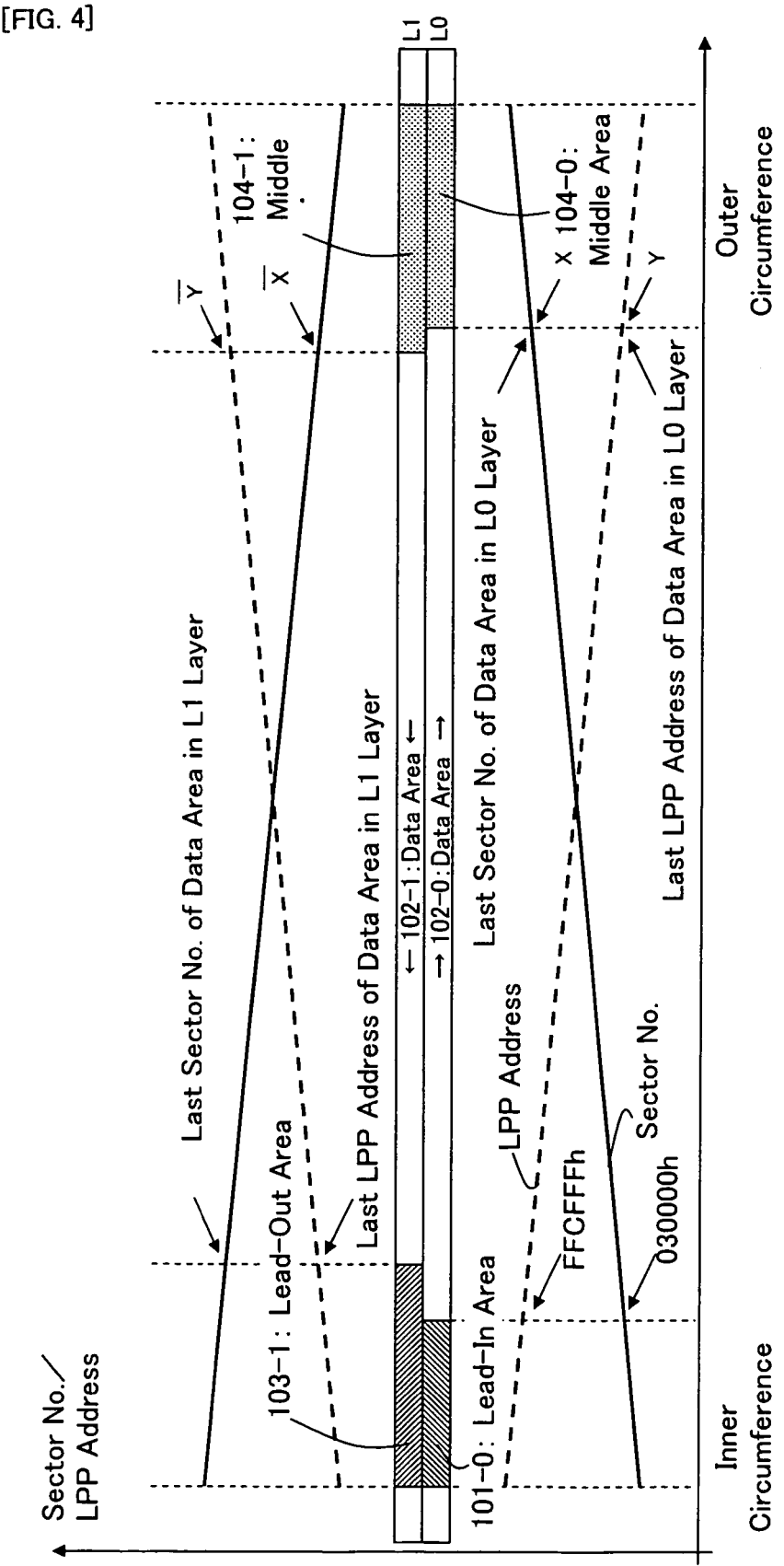
[FIG. 4]

[FIG. 5]
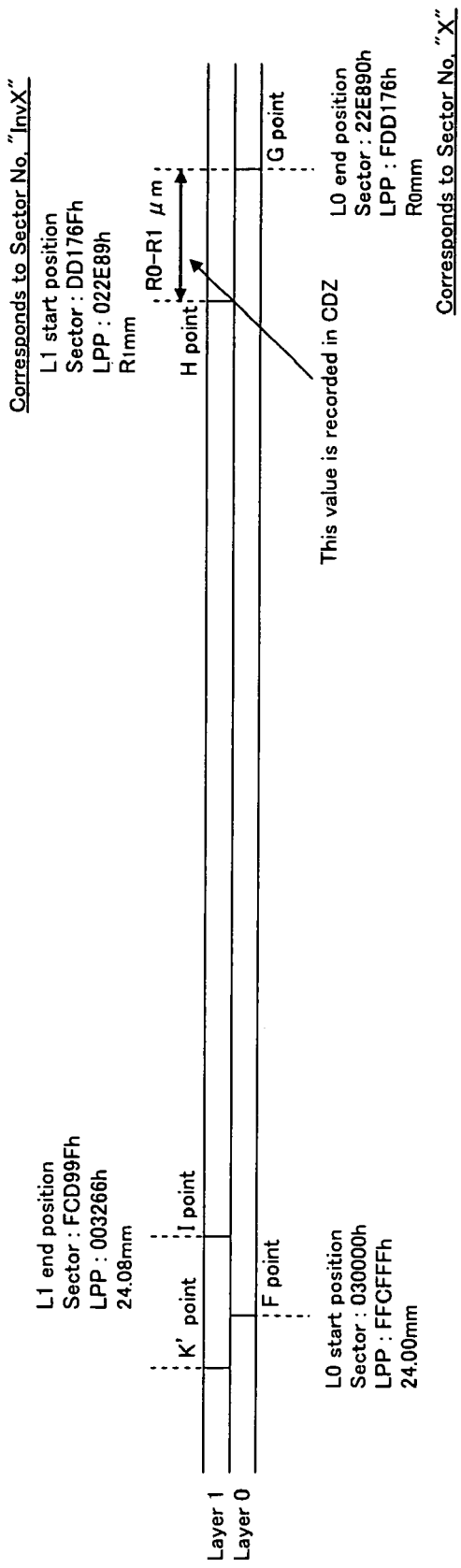

[FIG. 6]
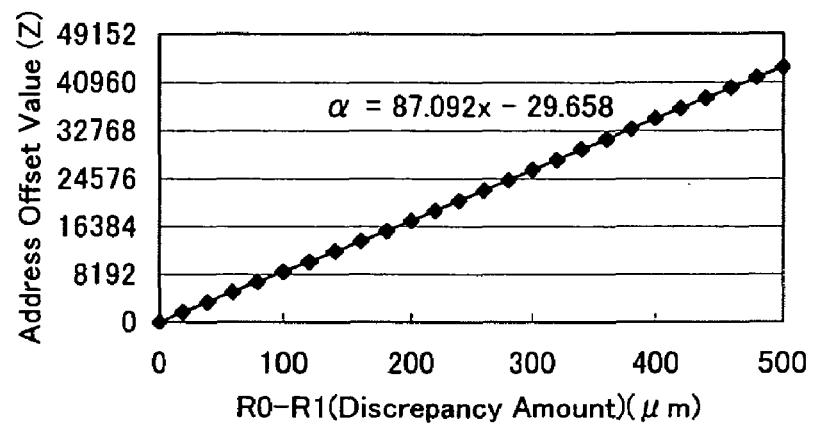

[FIG. 7]
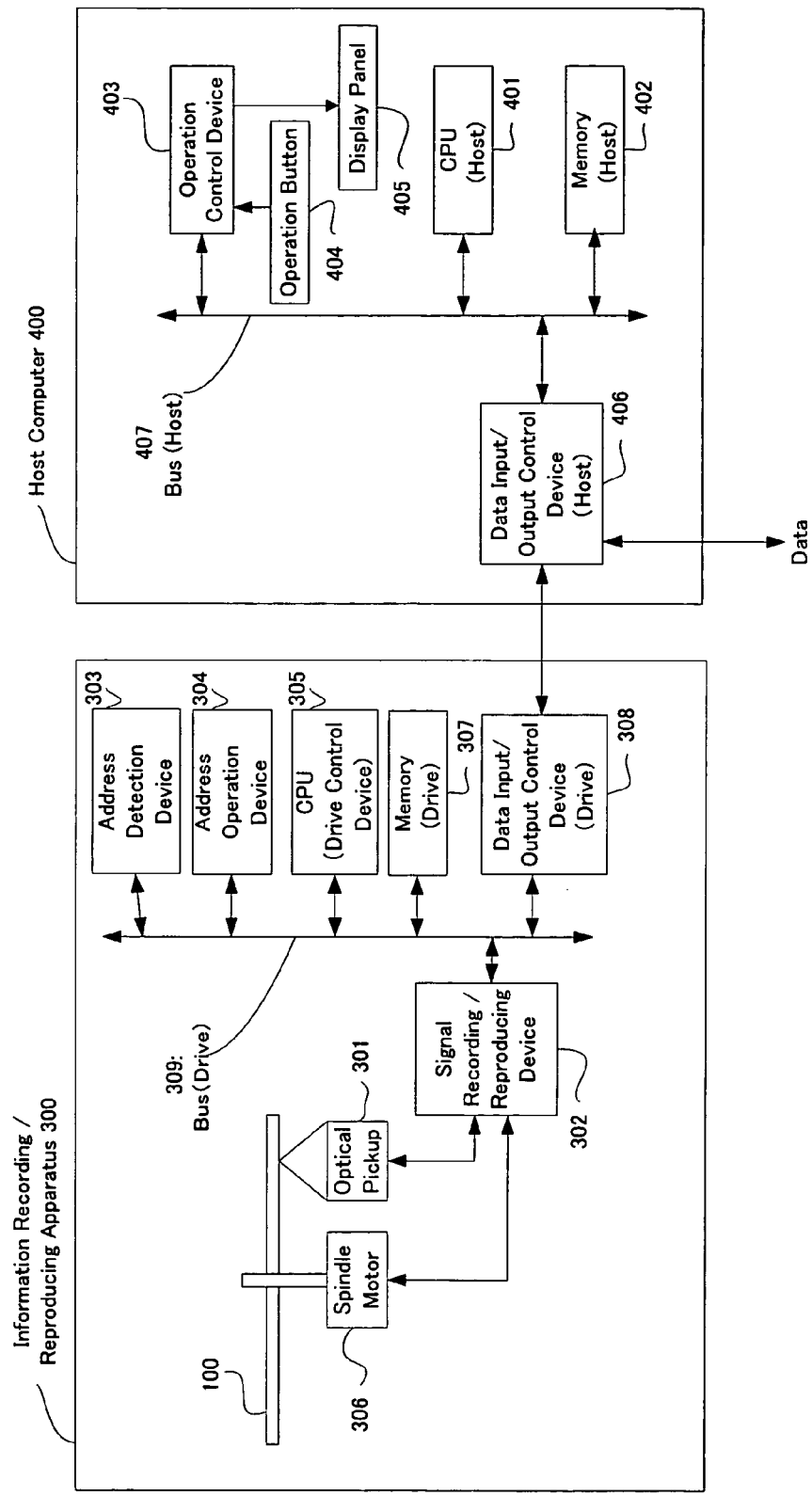

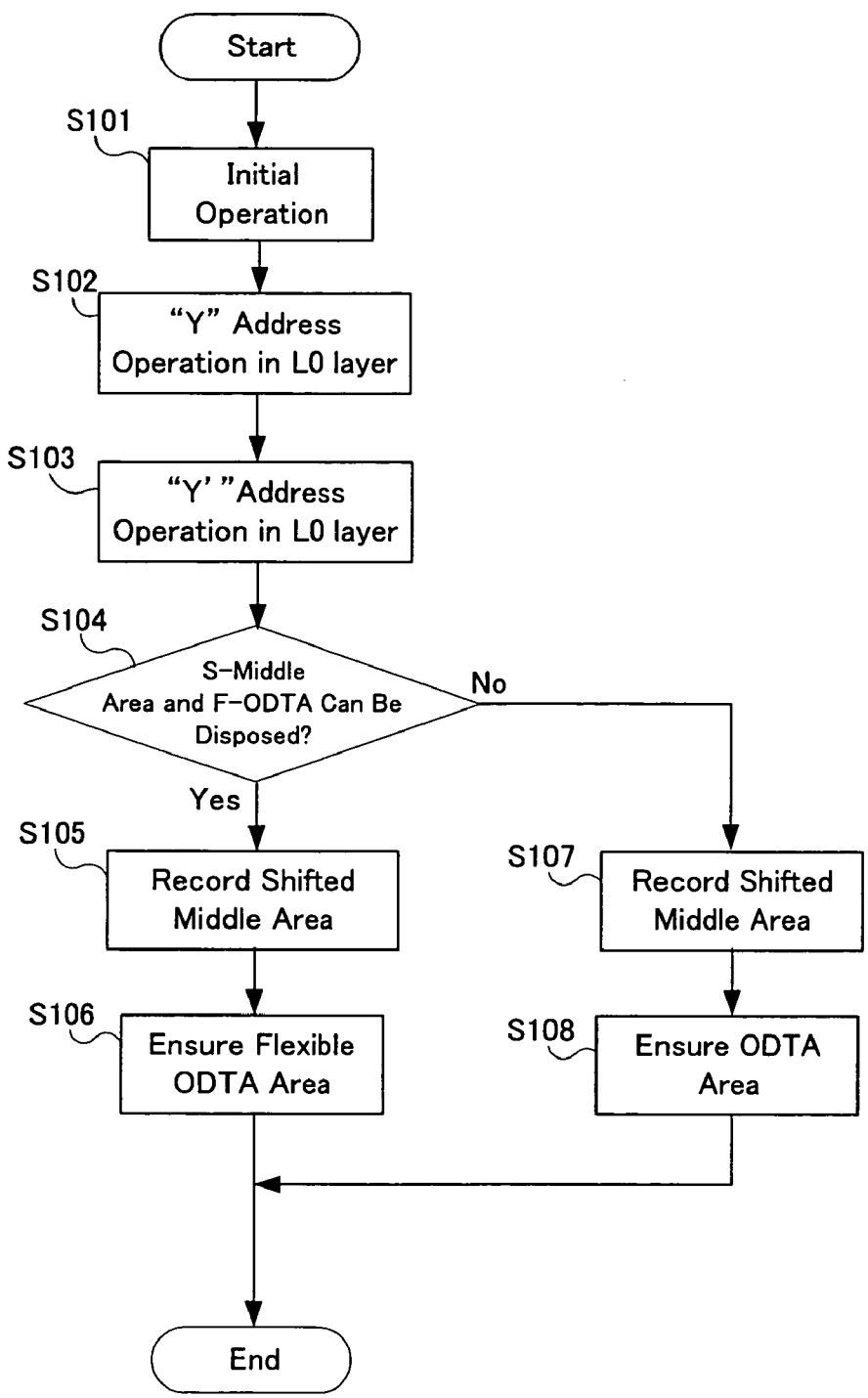
[FIG. 8]

[FIG. 9]
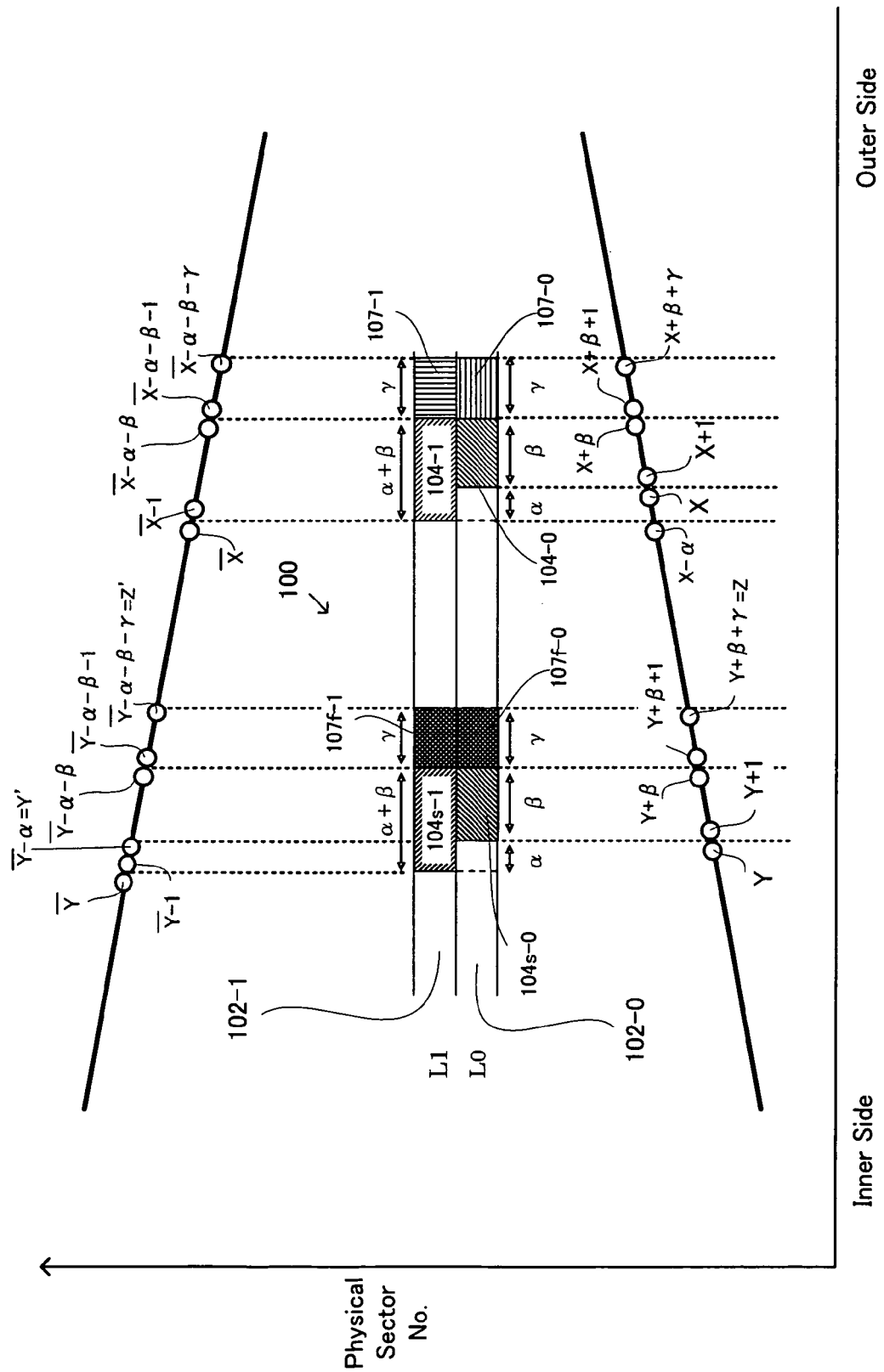

[FIG. 10]
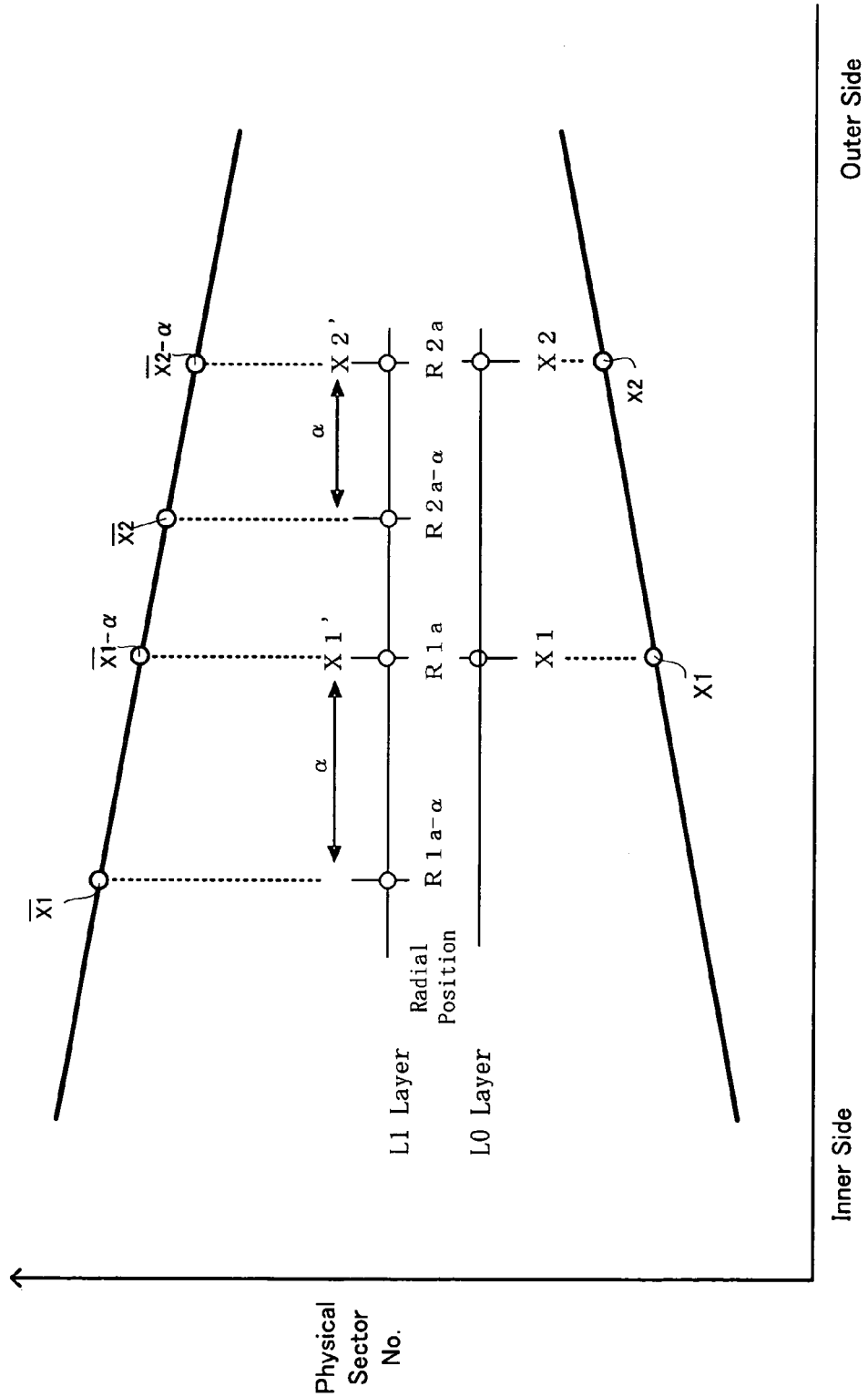

[FIG. 11]
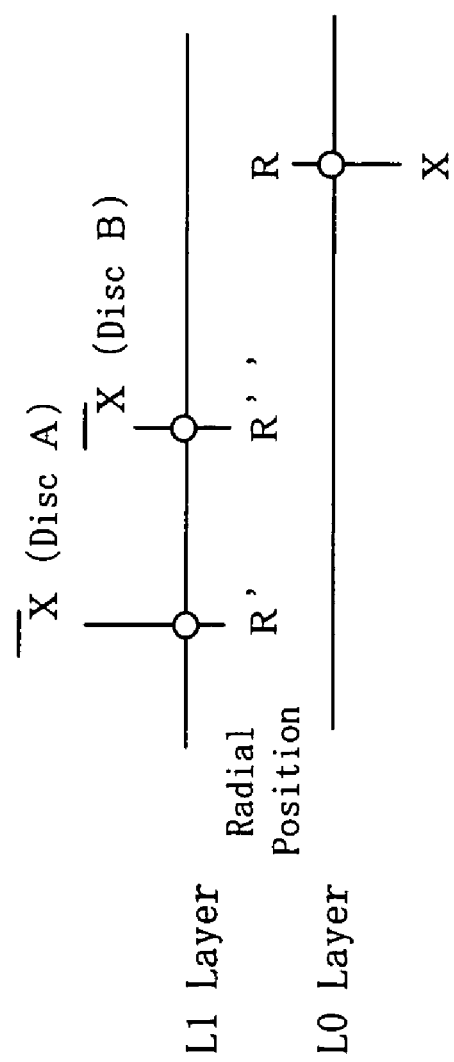

[FIG. 12]
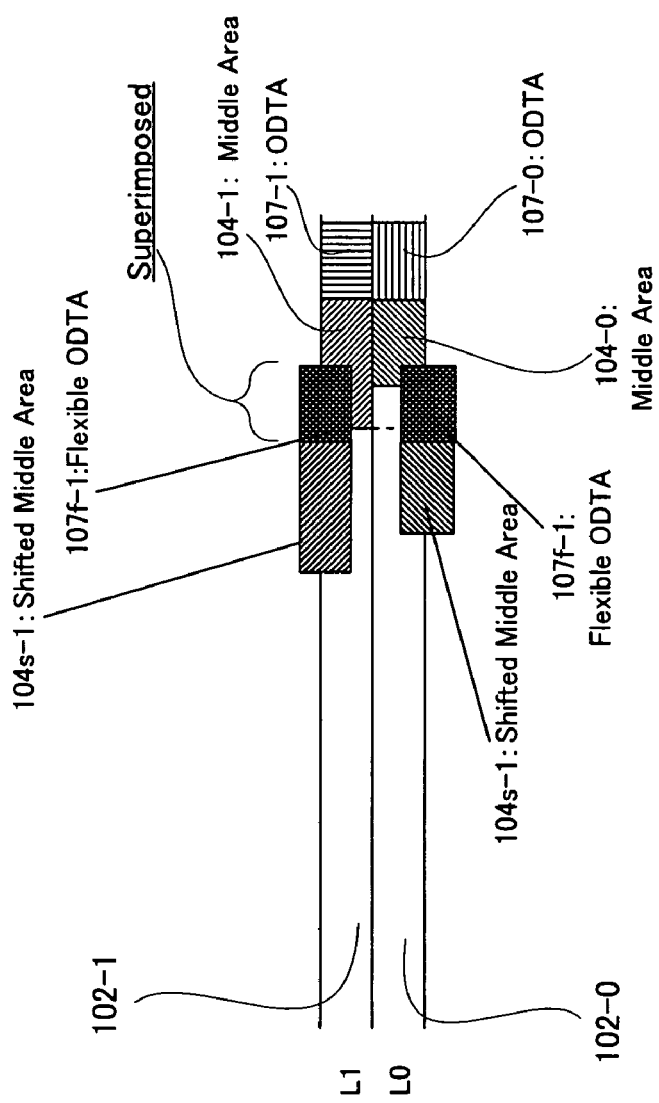

[FIG. 13]
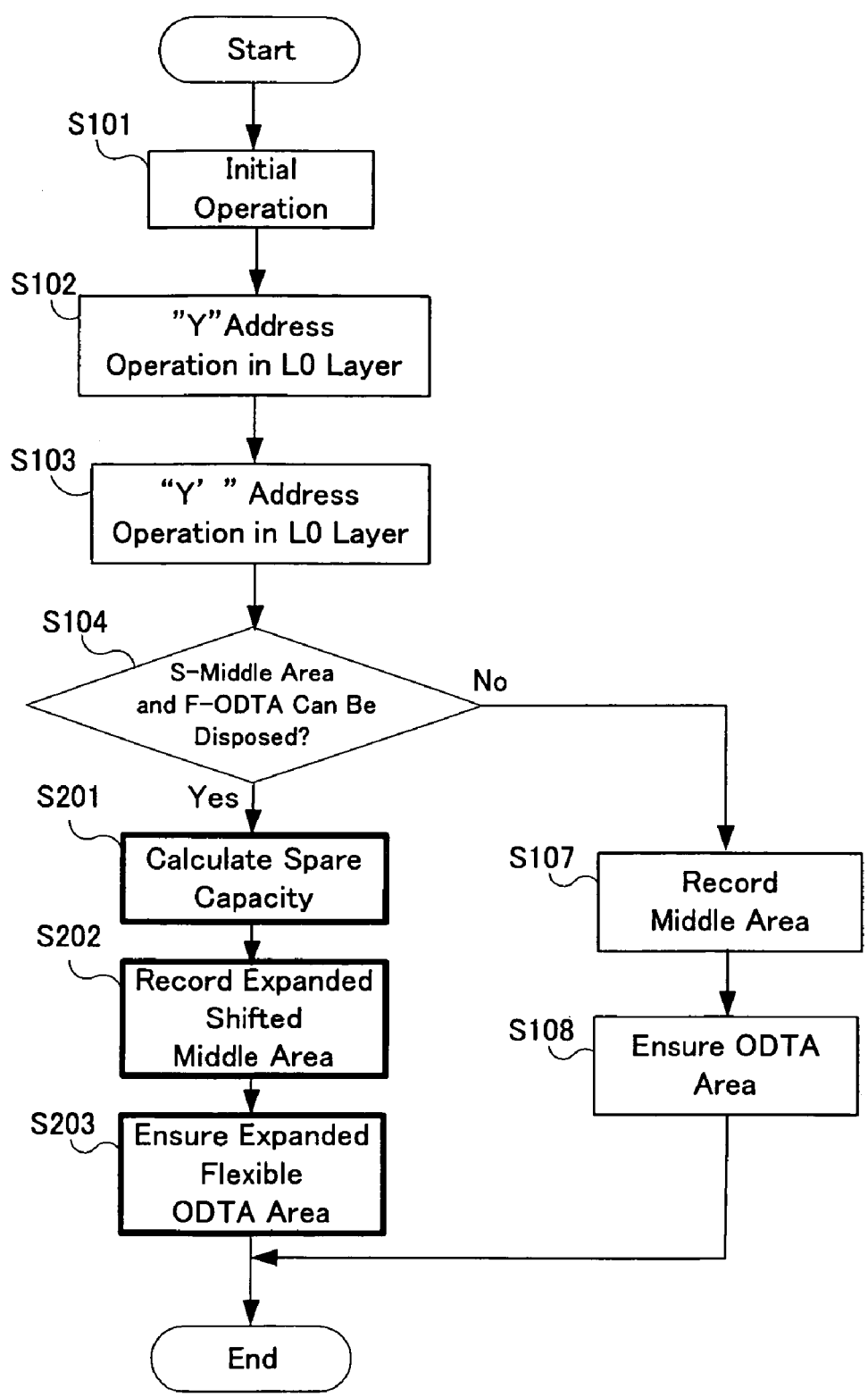

[FIG. 14]
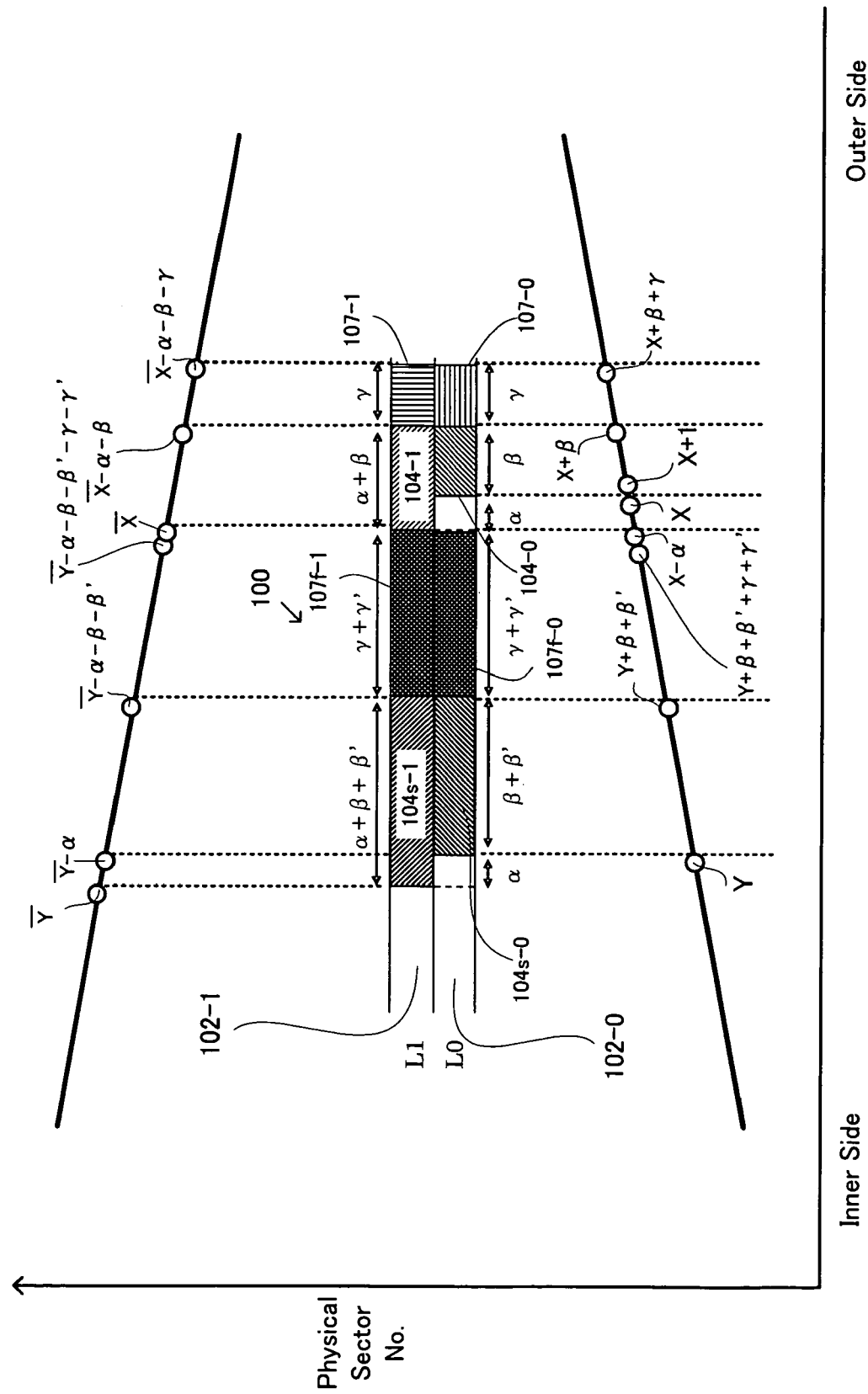

[FIG. 15]
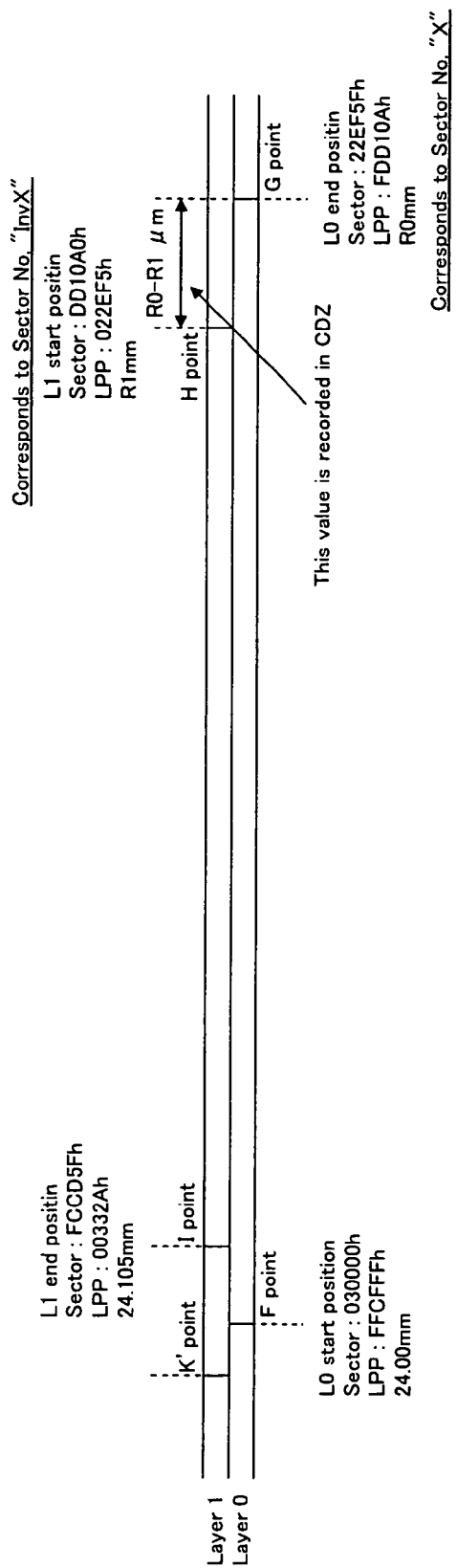

INFORMATION RECORDING APPARATUS AND METHOD, AND COMPUTER PROGRAM FOR RECORDING CONTROL

This application is a 371 of PCT/JP05/18625, filed Oct. 7, 2005.

TECHNICAL FIELD

The present invention relates to an information recording apparatus and method, such as a DVD recorder, for recoding information onto an information recording medium, such as a DVD and a CD (Compact Disc), and a computer program for recording control.

BACKGROUND ART

For example, in an information recording medium, such as a CD-ROM (Compact Disc-Read Only Memory), a CD-R (Compact Disc-Recordable), a DVD-ROM, a DVD-R, a DVD-RW, and a DVD+R, there are developed a multiple layer or multilayer type, or dual layer type optical disc and the like, in which a plurality of recording layers are laminated or pasted on the same substrate, as described in patent documents 1, 2, and the like. On an information recording apparatus, such as a DVD recorded, for recording information onto such a dual layer type, i.e., two-layer type optical disc, laser light for recording is focused onto a recording layer located on the front (i.e. a closer side to an optical pickup) (referred to as an "L0 layer", as occasion demands, in the application), as viewed from a laser light irradiation or emission side, to thereby record the information into the L0 layer in a rewritable method or irreversible change recording method by heat or the like. Then, the laser light is focused onto a recording layer located on the rear (i.e. a farther side from the optical pickup) (referred to as an "L1 layer", as occasion demands, in the application), as viewed from the laser light irradiation side, through the L0 layer and the like, to thereby record the information into the L1 layer in a rewritable method or irreversible change recording method by heat or the like.

For example, in the two-layer type optical disc in an opposite manner in which recording tracks are in opposite directions in the L0 layer and the L1 layer, it is provided with a middle area, as a buffer area. Moreover, an ODTA (Outer Disc Testing Area) is provided on the outer circumferential side adjacent to the middle area, in which power calibration is performed to detect an optimum recording power. More specifically, as the type of the middle area and the ODTA, there are (i) a middle area and an ODTA whose positions are fixed in advance on the most outer circumferential side of the disc, and (ii) a shifted middle area and a flexible ODTA in which an information recording apparatus (disc drive) is located on the outer circumferential side adjacent to a recording area, in accordance with the data amount of the information written (or to be written). The shifted middle area and the flexible ODTA are set not to be superimposed on the fixed middle area and ODTA.

Patent document 1: Japanese Patent Application Laid Open NO. 2000-311346
Patent document 2: Japanese Patent Application Laid Open NO. 2001-23237

DISCLOSURE OF INVENTION

SUBJECT TO BE SOLVED BY THE INVENTION

In the above-mentioned two-layer type optical disc, such as a two-layer type DVD-R, generally, an address which indicates the most outer circumferential position of a data area in the L0 layer (which is a so-called Last Address of Data Recordable Area in Layer 0, and which is hereinafter referred to as an "address which indicates the end of the L0 layer", as occasion demands) and an address which indicates the most outer circumferential position of a data area in the L1 layer (which is a so-called Start Address of Data Recordable Area in Layer 1, and which is hereinafter referred to as an "address which indicates the start of the L1 layer", as occasion demands) have a complement number relationship with each other. Moreover, the value of the address which indicates the most outer circumferential side of the L1 layer is generally determined by a disc manufacturer. Information about the end address of the L0 layer is formed on the disc, as pre-format data by an LPP (Land Pre Pit), or is pre-recorded in the management area of the optical disc, such as a control data zone.

It is found out, however, that a radial position corresponding to the pre-formatted or pre-recorded end address of the L0 layer and a radial position corresponding to the start address of the L1 layer vary depending on the disc manufacturer, the type of the optical disc, or the optical disc individual. In addition, a difference between the radial position corresponding to the end address of the L0 layer and the radial position corresponding to the start address of the L1 layer is not necessarily constant. Moreover, a difference in the address (a so-called address offset value) in the L0 layer and the L1 layer corresponding to the difference (discrepancy or deviation) in the radial position is not necessarily constant.

These facts cause the following three technical problems, (i) if the information recording apparatus (disc drive) is provided with the shifted middle area and the flexible ODTA when the information written (or to be written) has a small data capacity, and (ii) if the shifted middle area and the flexible ODTA are expanded in order to perform a stable recording operation without the runaway of an optical pickup provided for the information recording apparatus into an unrecorded area.

(1) Since a function and table or the like which indicate a relationship between the address and the radial position in the L0 layer and the L1 layer in view of the above-mentioned difference (or discrepancy) in the radial position in the L0 layer and the L1 layer, is unclear, there is such a technical problem that it is technically difficult to set the inner end and the outer end of the flexible ODTA (or the outer end of the shifted middle area) in the L0 layer and the L1 layer in the same radial position.

(2) Since the relationship between the address and the radial position in the L0 layer and the L1 layer is unclear, there is such a technical problem that the flexible ODTA (or shifted middle area) in the L0 layer and the L1 layer is likely superimposed on a middle area fixed and located on the outer circumferential side.

(3) There is also such a technical problem that in order to set the same radial position, in response to the problem (1), it is necessary to perform complicated control in the recording operation, such as providing an object lens with a position sensor in order to perform the position control of the optical pickup. In addition, there is also such a technical problem that in order not to superimpose the flexible ODTA (or shifted middle area) on the middle area fixed and located on the outer circumferential side, in response to the problem (2), it is necessary to perform complicated address calculation in view of many parameters, such as the disc manufacturer, the type of the optical disc, the optical disc individual and the error of a track pitch.

It is therefore an object of the present invention to provide an information recording apparatus and method which can properly record information even onto an information recording medium having a plurality of recording layers, as well as a computer program which makes a computer function as the information recording apparatus.

Means for Solving the Subject (Information Recording Apparatus)

The information recording apparatus of the present invention will be discussed hereinafter.

The above object of the present invention can be achieved by an information recording apparatus for recording record information onto an information recording medium provided with at least: a first recording layer (an L0 layer) in which a first recording area (a shifted (S) middle area) can be formed, and a second recording layer (an L1 layer) which has a relative discrepancy with the first recording layer in a radial direction and in which a second recording area (a S middle area) can be formed, the information recording apparatus provided with: a writing device capable of writing the record information into the first recording layer and the second recording layer; an obtaining device for obtaining offset information which indicates the relative discrepancy; a calculating device for calculating an address which indicates a second border point of the second recording layer facing a first border point of the first recording layer, on the basis of the obtained offset information; and a controlling device for controlling the writing device to write the record information (i) to form the first recording area, with the first border point as a recording end position or a recording start position, and (ii) to form the second recording area, with the second border point which is indicated by the calculated address as a recording end position or a recording start position.

According to the information recording apparatus of the present invention, the record information is written into the first recording layer and the second recording layer which has the relative discrepancy with the first recording layer in the radial direction, along a first recording track of the first recording layer, for example. At the same time, or before or after that, the record information is written along a second recording track of the second recording layer, for example. Specifically, the first recording track may be directed from one to the other side out of the inner and the outer circumferential sides of a disc-shaped substrate, for example, provided for the information recording medium. On the contrary, the second recording track may be directed from the other to the one side. In other words, in the two-layer type or multilayer type information recording medium, continuous recording in an "opposite manner" can be performed in which the recording tracks are in the opposite directions between the two recording layers. Therefore, if the recording is continuously performed from the end of the first recording layer, i.e. an end portion on the other side, such as an end on the outer circumferential side, to the start of the second recording layer, i.e. an end portion on the other side, such as an end on the outer circumferential side, it is hardly or not necessary to change, in the radial direction, the irradiation position of laser light on the substrate surface, in changing the recording layer targeted for an information recording process or information reproduction process. Thus, it is possible to perform quick layer jump (i.e. a layer change operation). This is extremely useful in practice, in the point that it facilitates uninterrupted reproduction without a special buffer function to change the recording layer, in recording the continuous record information, such as a movie. Alternatively, the first recording track may be directed from one to the other side out of the above-mentioned inner and the outer circumferential sides, and the second recording track may be also directed from the one to the other side, as in the first recording layer. In other words, in the two-layer type or multilayer type information recording medium, the continuous recording in a "parallel manner" can be performed in which the recording tracks are in the same direction between the two recording layers. In the parallel manner, if the recording or reproduction is ended in the first recording layer, an optical pickup, located on the most outer circumference, needs to be displaced to the most inner circumference again when the recording or reproduction is started in the second recording layer. Thus, as compared to the opposite manner described later, it takes more time to change the first recording layer to the second recording layer, by that much.

In particular, according to the information recording apparatus of the present invention, with respect to the above-mentioned information recording medium, under the control of the controlling device, such as a CPU (Central Processing Unit) of a drive or a host computer, the writing device, such as an optical pickup, writes at least one portion of the record information into the first recording layer to form the first recording area, with the first border point as the recording end position or the recording start position.

At the same time, or before or after that, the calculating device calculates the address which indicates the second border point of the second recording layer "facing" the first border point, on the basis of the "offset information" obtained by the obtaining device. The "offset information" of the present invention herein is information about an offset amount (discrepancy amount) which indicates a difference in the radial position, for example, between a first point in the first recording layer and a second point in the second recording layer "corresponding to" the first point, caused by the relative discrepancy in the radial direction between the first and second recording layers or between the first and second recording tracks. The offset information may be indicated by the number of sectors or the number of ECC blocks, which is a predetermined unit of the address. Or the offset information may be indicated by the length (μm) (or ¹⁄₁₀₀₀ (mm)) in the radial direction of an optical disc, and it may be convertible to the number of sectors or the number of ECC blocks, by a predetermined linear (first-order) function or a predetermined step function, as an address offset value. Alternatively, it may be a fixed value designated for each type of the information recording medium, such as a disc type, for example, a fixed value designated for each disc manufacturer, or a fixed value determined in various format standards, for example.

Moreover, the term "corresponding to" in the present invention means a relation in which one position to another position can be uniquely specified. For example, if a sector number of one position has a complement number relationship with a sector number of another position, it can be said that the one position corresponds to the another position. Incidentally, the first point may be the most outer circumferential point of the recording area of the first recording layer.

Moreover, the term "facing" in the present invention may mean that the radial positions are substantially equal, and may mean that the radial positions are substantially equal, even including a predetermined margin or the like, such as 80 (μm) and 105 (μm). Specifically, the relative discrepancy in this aspect may include a discrepancy in the address, caused by a difference in the start position of the LPP (Land Pre Pit) in the L0 layer and the L1 layer, if the LPP is prepared, as a preformat address in the first recording layer and the second recording layer, in a manner of laser cutting or the like.

Then, under the control of the controlling device, the writing device writes another portion of the record information to form the second recording area, with the second border point which is indicated by the calculated address as the recording end position or the recording start position.

In particular, according to the information recording apparatus of the present invention, a relationship between the address and the radial position in the first recording layer and the second recording layer is known on the basis of the offset information. Therefore, it is possible to dispose the first and second recording areas, such as a variable buffer area and a variable calibration area, in proper positions in the first recording layer and the second recording layer, by the information recording apparatus. Thus, it is possible to realize a recording operation and an area ensuring operation, more accurately. At the same time, it is possible to use the recording areas of the first and second recording layers, more effectively, without depending on the relative discrepancy between the layers of the information recording medium (in other words, the relative discrepancy between the layers, as an individual difference that individuals of the information recording mediums have).

In one aspect of the information recording apparatus of the present invention, the information recording medium is further provided with a management area to record therein the offset information corresponding to (or capable of corresponding to) the information recording medium, the obtaining device obtains the offset information by reading the offset information from the management area, and the calculating device calculates the address which indicates the second border point, on the basis of the obtained offset information.

According to this aspect, by virtue of the obtaining device, the offset information pre-recorded by the laser light, for example, is obtained in the management area in at least one of the first and second recording layers.

As a result, it is possible to obtain the offset information corresponding to the type of the information recording medium, a manufacturer, an individual difference, or the like, so that it is possible to realize the recording operation and the area ensuring operation, more accurately.

In another aspect of the information recording apparatus of the present invention, it is further provided with a storing device (memory) for storing the offset information corresponding to (or capable of corresponding to) the information recording medium, the calculating device calculating the address which indicates the second border point, on the basis of the stored offset information.

According to this aspect, it is possible to omit the obtaining operation, such as reading the offset information from the above-mentioned information recording medium, so that it is possible to realize the recording operation and the area ensuring operation, more quickly.

In another aspect of the information recording apparatus of the present invention, the information recording medium is provided with, as the first recoding layer and the second recording layer: at least one of (i) a data area to record therein the record information; (ii) a fixed buffer area in which a radial position is fixed, which is formed by recording buffer data which is at least one portion of the record data, and which is to prevent a recording or reproduction position with respect to the first recording layer and the second recording layer from deviating to an unrecorded area; and (iii) a variable buffer area which is located on an inner circumferential side of the fixed buffer area, which can be located adjacently to the data area, which is variable-length, and which is to prevent the recording or reproduction position from deviating to the unrecorded area, the calculating device calculates an address which indicates a second outer circumferential end of the variable or fixed buffer area in the second recording layer, facing a first outer circumferential end of the variable or fixed buffer area in the first recording layer, on the basis of the obtained offset information and a data amount of the variable or fixed buffer area, and the controlling device controls the writing device to write the buffer data until the first outer circumferential end, as well as from the second outer circumferential end, in response to a finalize instruction to the information recording medium.

According to this aspect, it is possible to make the first outer circumferential end of the variable or fixed buffer area in the first recording layer, face the second outer circumferential end of the variable or fixed buffer area in the second recording layer. Thus, it is possible to make the inner circumferential ends of the variable or fixed calibration areas face each other, which are adjacently located on the outer circumferential side of the variable or fixed buffer areas.

As a result, it is possible to dispose the variable or fixed calibration area in a proper position, in addition to the variable or fixed buffer area. Thus, it is possible to realize the more effective use of the recording area.

In another aspect of the information recording apparatus of the present invention, the information recording medium is provided with, as the first recoding layer and the second recording layer: at least one of (iv) a fixed calibration area in which a radial position is fixed, and in which data for test writing, which is one portion of the record information, can be recorded in order to obtain an optimum recording power of laser light for recording; and (v) a variable calibration area which is located on an inner circumferential side of the fixed calibration area, which can be located adjacently to the data area, which is variable-length, and in which the data for test writing can be recorded, the calculating device calculates an address which indicates a second inner circumferential end of the variable or fixed calibration area in the second recording layer, facing a first inner circumferential end of the variable or fixed calibration area in the first recording layer, and calculates an address which indicates a fourth outer circumferential end of the variable or fixed calibration area in the second recording layer, facing a third outer circumferential end of the variable or fixed calibration area in the first recording layer, on the basis of the obtained offset information and a data amount of the variable or fixed calibration area, and the controlling device controls the writing device to write the data for test writing into a section from the first inner circumferential end to the third outer circumferential end, as well as into a section from the second inner circumferential end to the fourth outer circumferential end, in response to an instruction for obtaining the optimum recording power to the information recording medium.

According to this aspect, it is possible to dispose the variable or fixed calibration area in a proper position. Thus, it is possible to realize the more effective use of the recording area.

If the inner and outer circumferential ends of the variable or fixed calibration area in the first recording layer do not face the inner and outer circumferential ends of the variable or fixed calibration area in the second recording layer and there is a discrepancy (deviation), the data for test writing is test-written by relatively strong laser light in the variable or fixed calibration area. Thus, in a not-facing, deviated area, the strong laser light passes through, so that it cannot be used even as various recording areas, such as the data area.

As opposed to this, according to this aspect, it is possible to dispose the variable or fixed calibration area in a proper position. Thus, it is possible to realize the more effective use of the recording area.

In an aspect associated with the controlling device, the controlling device may control the writing device to write the record information while the variable or fixed calibration area is located on an outer circumferential side of the variable or fixed buffer area.

By virtue of such construction, it is possible to dispose the variable or fixed buffer area and the variable or fixed calibration area, in proper positions. Thus, it is possible to realize the more effective use of the recording area.

Moreover, in an aspect associated with the controlling device, the information recording apparatus may be further provided with a judging device for judging whether or not the outer circumferential end of variable calibration area can be located on an inner circumferential side of the inner circumferential end of the fixed buffer area, on the basis of the obtained offset information and the data amount of the variable buffer area and variable calibration area, the controlling device (i) controlling the writing device, to write the record information while the variable buffer area and the variable calibration area are located on the inner circumferential side of the fixed buffer area and the fixed calibration area if it is judged that the outer circumferential end of variable calibration area can be located by the judging device, and (ii) controlling not to dispose the variable buffer area and the variable calibration area if it is not judged that the outer circumferential end of variable calibration area can be located.

By virtue of such construction, the judging device can judge whether or not the variable calibration area is superimposed on the fixed buffer area, more accurately, on the basis of the relationship between the address and the radial position in the first and second recording layers, which is known by the offset information, and the data amounts of the variable buffer area and the variable calibration area. In accordance with the judgment result, the controlling device determined whether or not to dispose the variable buffer area and the variable calibration area.

As a result, it is possible to realize the recording operation for the variable buffer area and the area ensuring operation for the variable calibration area, more efficiently, by the information recording apparatus.

Moreover, in an aspect associated with the controlling device, the information recording apparatus may be further provided with a spare capacity calculating device for calculating a spare capacity of a space area from the outer circumferential end of the variable calibration area to the inner circumferential end of the fixed buffer area, the controlling device controlling the writing device to write the record information while (i) one portion of the calculated spare capacity is distributed into the variable buffer area, and (ii) another portion of the calculated spare capacity is distributed into the variable calibration area.

By virtue of such construction, it is possible to eliminate the waste of the recording area, to thereby realize the recording operation for the variable buffer area and the area ensuring operation for the variable calibration area, more efficiently.

Moreover, in an aspect associated with the controlling device, the controlling device may control the writing device to write the buffer data while the inner circumferential end of the variable or fixed buffer area in the second recording layer is located on the inner circumferential side of the inner circumferential end of the variable or fixed buffer area in the first recording area.

By virtue of such construction, the record information is recorded into the recording area, such as the data area, in the second recording layer, by the laser light definitely passing through the recording area in the first recording layer. Thus, it is possible to make good information recording and reproduction features in the second recording layer.

(Information Recording Method)

The information recording method of the present invention will be discussed hereinafter.

The above object of the present invention can be also achieved by an information recording method in an information recording apparatus provided with a writing device capable of writing record information into a first recording layer (an L0 layer) and a second recording layer (an L1 layer), onto an information recording medium provided with at least: the first recording layer in which a first recording area (a S middle area) can be formed, and the second recording layer which has a relative discrepancy with the first recording layer in a radial direction and in which a second recording area (a S middle area) can be formed, the information recording method provided with: an obtaining process of obtaining offset information which indicates the relative discrepancy; a calculating process of calculating an address which indicates a second border point of the second recording layer facing a first border point of the first recording layer, on the basis of the obtained offset information; and a controlling process of controlling the writing device to write the record information (i) to form the first recording area, with the first border point as a recording end position or a recording start position, and (ii) to form the second recording area, with the second border point which is indicated by the calculated address as a recording end position or a recording start position.

According to the information recording method of the present invention, it is possible to receive the various benefits owned by the above-mentioned information recording apparatus of the present invention.

Incidentally, in response to the various aspects of the information recording apparatus of the present invention described above, the information recording method of the present invention can adopt various aspects.

(Computer Program)

The computer program of the present invention will be discussed hereinafter.

The above object of the present invention can be also achieved by a computer program of instructions for recording control and for tangibly embodying a program of instructions executable by a computer provided in the above-mentioned information recording apparatus of the present invention (including its various aspects), to make the computer function as at least one of the writing device, the obtaining device, the calculating device, and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the writing device, the obtaining device, the calculating device, and the controlling device.

According to the computer program product of the present invention, the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned information recording apparatus.

These effects and other advantages of the present invention will be more apparent from the following embodiments.

As explained above, according to the information recording apparatus of the present invention, it is provided with: the writing device; the obtaining device; the calculating device; and the controlling device. According to the information recording method of the present invention, it is provided with: the obtaining process; the calculating process; and the controlling process. Therefore, it is possible to accurately learn the relationship between the address and the radial position in the first and second recording layers, on the basis of the offset information. Moreover, according to the information recording apparatus and method of the present invention, it is possible to realize the recording operation and the area ensuring operation, more accurately, by disposing the various recording areas (the first and second recording areas), such as the variable buffer area and the variable calibration area, in proper positions in the first and second recording layers. At the same time, it is possible to use the recording areas in the first and second recording layers, more effectively, without depending on the relative discrepancy between the layers of the information recording medium (in other words, the relative discrepancy between the layers, as an individual difference that individuals have).

Moreover, according to the computer program of the present invention, it makes a computer function as the above-mentioned information recording apparatus, so that it is possible to realize the recording operation and the area ensuring operation, more accurately and efficiently, with respect to the above-mentioned information recording medium.

BRIEF DESCRIPTION OF DRAWINGS

[FIG. 1] FIG. 1(a) and FIG. 1(b) are a substantial plan view showing the basic structure of an optical disc having a plurality of recording areas in an embodiment of an information recording medium of the present invention (FIG. 1(a)), and a schematic cross sectional view of the optical disc and a corresponding conceptual diagram showing a recording area structure in the radial direction (FIG. 1(b)).

[FIG. 2] FIG. 2 is one conceptual graph showing the data structure of a two-layer type optical disc in the embodiment of the information recording medium, a physical sector number constituting an ECC block in the recording area of the optical disc, and a recording or reproducing method in an opposite manner of the optical disc.

[FIG. 3] FIG. 3 is another conceptual graph showing the data structure of the two-layer type optical disc in the embodiment of the information recording medium, the physical sector number constituting the ECC block in the recording area of the optical disc, and the recording or reproducing method in the opposite manner of the optical disc.

[FIG. 4] FIG. 4 is a conceptual graph showing the data structure of the two-layer type optical disc in the embodiment of the information recording medium, the physical sector number in the recording area of the optical disc, a land pre-pit shown by an ECC block unit, and the recording or reproducing method in the opposite manner of the optical disc.

[FIG. 5] FIG. 5 is a schematic cross sectional view of the recording area showing a peculiar offset amount (discrepancy amount) in the two-layer type optical disc in the embodiment of the information recording medium.

[FIG. 6] FIG. 6 is a graph showing a correlation between the offset amount (discrepancy amount) peculiar to the individual of the two-layer type optical disc in the embodiment of the information recording medium and an address offset value of the present invention.

[FIG. 7] FIG. 7 is a block diagram showing the basic structure of a host computer and an information recording/reproducing apparatus in embodiments of the information recording apparatus of the present invention.

[FIG. 8] FIG. 8 is a flowchart showing a recording operation of recording a shifted middle area etc. and an area ensuring operation of ensuring or reserving a flexible ODTA etc., performed by the information recording/reproducing apparatus in the first embodiment of the information recording apparatus of the present invention.

[FIG. 9] FIG. 9 is a schematic diagram showing the principle of the recording operation of recording the shifted middle area etc. and the area ensuring operation of ensuring or reserving the flexible ODTA etc., performed by the information recording/reproducing apparatus in the first embodiment of the information recording apparatus of the present invention.

[FIG. 10] FIG. 10 is a schematic diagram conceptually showing the principle of calculation of an address which properly indicates a predetermined point in the L1 layer corresponding to a predetermined point in the L0 layer, based on offset information, such as the above-mentioned address offset value "α", performed by the information recording/reproducing apparatus in the first embodiment of the information recording apparatus of the present invention.

[FIG. 11] FIG. 11 is a schematic diagram showing a difference between a first predetermined position in the L0 layer and a second predetermine position in the L1 layer corresponding to the address of the first predetermined position, in two information recording media in a comparison example.

[FIG. 12] FIG. 12 is a schematic diagram showing the principle of the recording operation of recording the shifted middle area and the area ensuring operation of ensuring or reserving the flexible ODTA, performed by an information recording/reproducing apparatus in the comparison example.

[FIG. 13] FIG. 13 is a flowchart showing the recording operation of recording the shifted middle area etc. and the area ensuring operation of ensuring or reserving the flexible ODTA etc., performed by the information recording/reproducing apparatus in the second embodiment of the information recording apparatus of the present invention.

[FIG. 14] FIG. 14 is a schematic diagram showing the principle of the recording operation of recording the shifted middle area and the area ensuring operation of ensuring or reserving the flexible ODTA, performed by the information recording/reproducing apparatus in the second embodiment of the information recording apparatus of the present invention.

[FIG. 15] FIG. 15 is a schematic cross sectional view of the recording area showing a peculiar offset amount (discrepancy amount) in the two-layer type optical disc in a second embodiment of the information recording medium.

DESCRIPTION OF REFERENCE CODES

100 . . . optical disc, 101-0 (101-1) . . . lead-in area, 102-0 (102-1) . . . data area, 103-0 (103-1) . . . lead-out area, 104-0 (104-1) . . . middle area, 104s-0 (104s-1) . . . shifted middle area, 105-0 (105-1) IDTA, 106-0 (106-1) . . . RMA, 107-0 (107-1) . . . ODTA, 107f-0 (107f-1) . . . flexible ODTA, 300 . . . information recording/reproducing apparatus, 301 . . . optical pickup, 302 . . . signal recording/reproducing device, 303 . . . address detection device, 304 . . . address operation device, 305 . . . CPU (drive control device), 306 . . . spindle motor, 307 (402) . . . memory, 308 (406) . . . data input/output control device, 309 (407) . . . bus, 400 . . . host computer, 401 . . . CPU (for host), 403 . . . operation control device, 404 . . . operation button, 405 . . . display panel, LB . . . laser light

BEST MODE FOR CARRYING OUT THE INVENTION

Hereinafter, the best mode for carrying out the invention will be explained in order in each embodiment with reference to the drawings.

(1) Embodiments of Information Recording Medium

At first, with reference to FIG. 1 to FIG. 6, an embodiment of the information recording medium of the present invention will be discussed in detail. Incidentally, in the optical disc in the embodiment, an opposite manner is adopted, as one specific example of a recording manner, in which the track pass of the L0 layer constituting one example of the "first recording track" of the present invention and the track pass of the L1 layer constituting one example of the "second recording track" of the present invention have opposite recording directions.

(1-1) Basic Structure

At first, with reference to FIG. 1(a) and FIG. 1(b), the basic structure of an optical disc in the embodiment of the recording medium of the present invention will be discussed. FIG. 1(a) is a substantial plan view showing the basic structure of an optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101 or a lead-out area 103; a data area 102; and a middle area 104, with a center hole 1 as the center. Then, for example, on a transparent substrate 106 of the optical disc 100, there are laminated recording layers, such as an L0 layer and an L1 layer. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(b), has such a structure that the L0 layer and the L1 layer, which constitute one example of the "first and second record layers" of the present invention as described later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower to upper side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure in the opposite manner on the two-layer type optical disc and the data structure of each layer will be discussed later.

(1-2) Detailed Structure

Next, with reference to FIG. 2 to FIG. 4, the detailed structure of the two-layer type optical disc in the embodiment of the information recording medium of the present invention will be discussed. More specifically, with reference to FIG. 2 to FIG. 4, the data structure of the two-layer type optical disc, a physical sector number (hereinafter referred to as a "sector number", as occasion demands) constituting an ECC block in the recording area of the optical disc, and a recording or reproducing procedure in the opposite manner of the optical disc will be discussed. FIG. 2 is one conceptual graph showing the data structure of the two-layer type optical disc in the embodiment of the information recording medium, the physical sector number constituting the ECC block in the recording area of the optical disc, and the recording or reproducing method in an opposite manner of the optical disc. FIG. 3 is another conceptual graph showing the data structure of the two-layer type optical disc in the embodiment of the information recording medium, the physical sector number constituting the ECC block in the recording area of the optical disc, and the recording or reproducing method in the opposite manner of the optical disc. FIG. 4 is a conceptual graph showing the data structure of the two-layer type optical disc in the embodiment of the information recording medium, the physical sector number in the recording area of the optical disc, a land pre-pit shown by an ECC block unit, and the recording or reproducing method in the opposite manner of the optical disc. Incidentally, the vertical axis in FIG. 2 to FIG. 4 indicates the land pre-pit address in addition to the sector number expressed by hexadecimal numeral, and the horizontal axis indicates a relative position in the radial direction of the optical disc.

As shown in FIG. 2, the two-layer type optical disc 100 in the embodiment of the information recording medium of the present invention is provided with two recording layers laminated on a not-illustrated substrate, i.e. the L0 layer and the L1 layer.

Specifically, the L0 layer is provided, from the inner to the outer circumferential side, with: an inner disc testing area (IDTA) 105-0 for the detection of an optimum recording power (calibration process); a recording management area (RMA) 106-0; a lead-in area 101-0; a data area 102-0; a middle area 104-0; and an outer disc testing area (ODTA) 107-0. Incidentally, one specific example of the "fixed calibration area" of the present invention is constructed from the ODTA 107-0 (and an ODTA 107-1 described later). Moreover, arrows in the IDTA 105-0 and the ODTA 107-0 show directions of consuming the recording area for the calibration process.

The lead-in area 101-0 is provided with a control data zone CDZ which constitutes one example of the above-mentioned "management area" of the present invention. In the control data zone CDZ, the "offset amount (or discrepancy amount)" of the present invention is pre-recorded with laser light or the like, for example. The offset amount (or discrepancy amount) will be discussed later in detail.

The middle area 104-0 has a basic function to prevent a recording or reproduction position with respect to the L0 layer and the L1 layer from deviating to an unrecorded area and the outside of the substrate. It also has a function as a so-called "jump buffer area", which is to prevent, in layer jump, the recording or production position from deviating to the unrecorded area and the outside of the substrate. Incidentally, one specific example of the "fixed buffer area" of the present invention is constructed form the middle area 104-0 (and a middle area 104-1 described later). Incidentally, the middle area 104-0 (or 104-1) is also referred to as a "fixed middle area 104-0 (or 104-1)", as occasion demands.

On the other hand, the L1 layer is provided, from the outer to the inner circumferential side, with: the ODTA 107-1; the middle area 104-1; a data area 102-1; a lead-out area 103-1; an RMA 106-1; and an IDTA 105-1.

In particular, in the optical disc 100 in the embodiment, the outer circumferential end of the data area 102-0 (102-1) may be located on the inner circumferential side if the data amount of the record information is relatively smaller than the entire recording capacity of the optical disc, in a Disc At Once recording manner or the like, for example, as shown in FIG. 3. In this case, in a direction to the outer circumferential side from the outer circumferential end of the data area 102-0 (102-1), there may be provided a shifted middle area 104*s*-0 (104*s*-1) and a flexible ODTA 107*f*-0 (107*f*-1). Incidentally, one specific example of the "variable buffer area" of the present invention is constructed from the shifted middle area 104*s*-0 (104*s*-1). Moreover, one specific example of the "variable calibration area" of the present invention is constructed from the flexible ODTA 107*f*-0 (107*f*-1).

The two-layer type optical disc 100 is constructed in the above manner, so that in the recording or reproduction of the optical disc 100, the laser light LB is irradiated from the side of a not-illustrated substrate, i.e., from the lower to the upper side in FIG. 2 and FIG. 3, by the optical pickup or the like of an information recording/reproducing apparatus in one specific example of the information recording apparatus of the present invention described later, and the focal distance thereof or the like is controlled. At the same time, the travel distance and direction in the radial direction of the optical disc 100 are controlled. By this, the data is recorded into each recording layer, or the recorded data is reproduced.

As the recording or reproduction procedure of the two-layer type optical disc in the embodiment of the information recording medium of the present invention, the opposite manner is adopted. The opposite manner herein is such a manner that the optical pickup of the information recording/reproducing apparatus described later is displaced from the inner to the outer circumferential side, i.e. in a direction of a right-pointing arrow in FIG. 2 and FIG. 3, in the L0 layer as the recording or reproducing procedure of the two-layer type optical disc, while the optical pickup is displaced from the outer to the inner circumferential side, i.e. in a direction of a left-pointing arrow in FIG. 2 and FIG. 3, in the L1 layer, to thereby perform the recording or reproduction on the two-layer type optical disc. In the opposite manner, if the recording or reproduction is ended in the L0 layer, the optical pickup, located on the most outer circumference, does not need to be displaced again to the most inner circumference when the recording or reproduction is started in the L1 layer, and it is enough if only the focal distance from the L0 layer to the L1 layer is changed. Thus, there is an advantage that a changing time from the L0 layer to the L1 layer is shorter than that in the parallel manner. This is why the opposite manner is adopted in the recording of large volumes of content information.

Specifically, as shown in the graph part of FIG. 2, at first, in the L1 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (hereinafter referred to as a "turn-around point" in the L0 layer, as occasion demands: refer to a C point in FIG. 2), and the optical pickup is displaced to the middle area 104-0 which functions as the buffer, by which the recording or reproduction is performed in the L0 layer. Incidentally, in the embodiment, "h" which is the end of "30000h" or the like indicates that it is expressed by hexadecimal numeral. On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 2), and the end position of the data area 102-1 with a sector number of "FCFFEFh" (refer to an E point in FIG. 2), and the optical pickup is displaced to the lead-out area 103-1, by which the recording or reproduction is performed in the L1 layer.

All the sector numbers in the L0 layer and the L1 layer explained above have a 15's complement number relationship in the hexadecimal numeral. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal numeral to a binary number of "000110101111111111111111", inverting the bits to "111001010000000000000000", and reconverting it to the "E50000h" in the hexadecimal numeral.

Thus, the record information, such as content, is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

With respect to the physical sector number explained above, a Logical Block Address (LBA) is assigned or allocated, one to one. More specifically, for example, a "000000" LBA corresponds to the sector number of "030000h", and a "17FFFF" LBA corresponds to the sector number of "1AFFFFh". Moreover, a "180000" LBA corresponds to the sector number of "E50000h", and a "2FFFEF" LBA corresponds to the sector number of "FCFFEFh". Thus, for example, a host computer can perform the recording and reproduction operations in accordance with the logical block address managed by a file system, for example, without aware of the physical sector number.

Now, with reference to FIG. 4, an explanation will be given to a relationship between the sector number in the opposite manner and the land pre-pit (hereinafter referred to as an "LPP", as occasion demands) shown by an ECC block unit, on the two-layer type optical disc in the embodiment of the information recording medium of the present invention. Incidentally, one specific example of the "address" of the present invention is constructed from the sector number and a land pre-pit address.

As shown in FIG. 4, it is possible to uniquely associate the sector number in the L0 layer and the L1 layer with the LPP address in the L0 layer and the L1 layer. More specifically, a sector number of "0030000h" in the hexadecimal numeral is converted to a binary number of "00000000001100000000000000000", the bits from the fifth to the 28th bit is inverted to "11111111110011111111111111", and it is reconverted to the "FFCFFFh" in the hexadecimal numeral. Therefore, all the LPP addresses in the L0 layer and the L1 layer have a 15's complement number relationship in the hexadecimal numeral, as in the sector number. Incidentally, a recording end position in the data area 102-0 (102-1) may be set in each recording layer.

Particularly in the embodiment, to facilitate the explanation more, the sector number is mainly adopted as an address unit.

(1-3) Offset Amount (Address Offset Value) Recorded on Information Recording Medium Next, with reference to FIG. 5 and FIG. 6, an offset amount (discrepancy amount) which is, for example, pre-recorded on the information recording medium of the present invention will be discussed. FIG. 5 is a schematic cross sectional view of the recording area showing a peculiar offset amount (discrepancy amount) in the two-layer type optical disc in the embodiment of the information recording medium. FIG. 6 is a graph showing a correlation between the offset amount (discrepancy amount) peculiar to the individual of the two-layer type optical disc in the embodiment of the information recording medium and the "difference in the address" of the present invention (which is referred to as an "address offset value", as occasion demands). Incidentally, the horizontal axis shows the offset amount (discrepancy amount) by a unit of "µm", and the vertical axis shows the sector number which expresses the address offset value by decimal numeral.

As shown in FIG. 5, the recording area of the L0 layer is between an "F" point to a "G" point, under the above-mentioned opposite manner. Specifically, in the "F" point, the sector number is "030000h", the LPP address is "FFCFFFh", and the radial position is "24 mm". In the "G" point, the sector number is "22E890h", the LPP address is "FDD176h", and the radial position is a variable "R0" µm (or "mm/1000"). Incidentally, the most outer circumferential position "G" point of the data area of the L0 layer constitutes one example of the "point shown by the end address of the L0 layer" in the present invention.

On the other hand, the recording area of the L1 layer is between an "H" point to an "I" point, under the above-mentioned opposite manner. Specifically, the "H" point corresponds to the "G" point in the opposite manner. In the "H" point, the sector number is "DD176Fh", the LPP address is "022E89h", and the radial position is a variable "R1" µm. Incidentally, the most outer circumferential position "H" point of the data area of the L1 layer constitutes one example of the "point shown by the start address of the L1 layer" in the present invention. In the "I" point, the radial position is set to be "24.08 mm" to reduce the recording area of the L1 layer by a predetermined margin, such as 80 µm, for example. Due to the setting of the radial position, the sector number is "FCD99Fh", and the LPP address is "003266h". Incidentally, the "I" point may be set by a media manufacturer, as the end position of the data area in the L1 layer.

In particular, on the two-layer type optical disc in the embodiment, offset information about the offset amount (discrepancy amount) is pre-recorded in the above-mentioned control data zone CDZ, wherein the offset amount (discrepancy amount) indicates a difference in the radial position between the most outer circumferential position "G" point of the data area in the L0 layer and the most outer circumferential position "H" point of the data area in the L1 layer. The "offset information" in the embodiment herein is an address offset value converted by a predetermined linear function in order to uniquely (i.e. having a relationship one to one) determine it in accordance with the offset amount (discrepancy amount). More specifically, as shown in FIG. 6, a correlation between the offset amount (discrepancy amount) (variable "x: R0-R1") and the address offset value (variable "α") is expressed by the following equation (1) which is a predetermined linear function.

$$\alpha = 87.092x - 29.658 \tag{1}$$

Incidentally, the predetermined linear function expressed by the equation (1) can be obtained, experimentally, experientially or theoretically, or by a simulation, for example. Specifically, it may be constructed to adopt the mean value of (i) one address offset value which is obtained, by the equation (1) of the predetermined linear function, on the basis of the offset amount (discrepancy amount) between (i-1) the above-mentioned most outer circumferential position "G" point in the L0 layer (the above-mentioned end of the L0 layer) and (i-2) the most outer circumferential position "H" point in the L1 layer (the above-mentioned start of the L1 layer); and (ii) another address offset value which is obtained on the basis of the offset amount (discrepancy amount) between (ii-1) the most inner circumferential position "F" point in the L0 layer and (ii-2) a "K'" point in the L1 layer corresponding to the "F" point. Alternatively, the address offset values for any point from an inner position to an outer position may be respectively calculated by using another type of linear (or first-order) expression obtained by the two values. More specifically, the predetermined linear function may be not only obtained on the basis of the offset amount (discrepancy amount) between the above-mentioned most outer circumferential position "G" point in the L0 layer (the above-mentioned end of the L0 layer) and the most outer circumferential position "H" point in the L1 layer (the above-mentioned start of the L1 layer), but also obtained by a simulation or the like, on the basis of the offset amount (discrepancy amount) between the most inner circumferential position "F" point in the L0 layer and the "K'" point in the L1 layer corresponding to the "F" point.

The explanation returns to FIG. 5.

Therefore, the difference in the radial position between the "G" point and the "H" point, "R0-R1" µm, is substituted into the variable "x", and the address offset value is indicated by the variable "α" which indicates the calculation result. The calculated address offset value is obtained or calculated by the information recording apparatus described later, and on the basis of the address offset value, the proper addresses of a recording start position in the L1 layer and the recording end position are calculated. Incidentally, the address offset value may be shown by a unit of sector number, or by a unit of one ECC block (=16 sectors). More specifically, in the case where the offset amount (discrepancy amount) is 80 μm, "α=6937 (sectors)" if "x=80" is substituted into the equation (1), "α=434 (ECC blocks)" by the unit of one ECC block (16 sectors), and "α=1B2h (ECC blocks)" by the hexadecimal numeral.

In addition, the correlation between the offset amount (discrepancy amount) and the address offset value may be also shown by a step function, for example, not by a linear function which is the predetermined linear function. More specifically, if the offset amount (discrepancy amount) is 0 to 100 μm, the address offset value is set to 4325 sectors, for example. If the offset amount (discrepancy amount) is 101 to 200 μm, the address offset value is set to 13034 sectors, for example. If the offset amount (discrepancy amount) is 201 to 300 μm, the address offset value is set to 21743 sectors, for example. The address offset value may be shown in this manner. Therefore, the manufacturer of the information recording medium can be given a certain degree of allowance range to the accuracy of the detection of the offset amount (discrepancy amount) in recording the offset information about the offset amount (discrepancy amount) onto the two-layer type optical disc. More specifically, according to the study by the inventors of the present invention, it is possible to give the following four main factors which cause the offset amount (discrepancy amount). It turns out that the factors are (i) an error in the radial position with respect to the pre-format address if a single cutting apparatus (laser cutting apparatus) prepares a stampa, (ii) dispersion in the radial position due to an individual difference of the cutting apparatus (laser cutting apparatus), (iii) an error in the contraction of a base (metal mold) if a single injection molding machine prepares a substrate, and (iv) dispersion of a contraction ratio of the base (metal mold) due to an individual difference of the injection molding machine.

As described above, even if the manufacturer of the information recording medium causes the offset amount (discrepancy amount) on the two-layer type optical disc, the offset information about the offset amount (discrepancy amount) is pre-recorded in the control data zone CDZ, or stored (memorized) in a memory area of the drive (or the information recording apparatus). Alternatively, the address offset value "α" obtained by converting "R0-R1" μm in FIG. 5 by the predetermined linear function, is pre-recorded in the control data zone CDZ, or stored (memorized) in the memory area of the drive. Therefore, a relationship between the address and the radial position in the L0 layer and the L1 layer is accurately known on the bases of the offset information "α", by the information recording apparatus described later. Therefore, it is possible to realize a recording operation and an area ensuring operation, more accurately and efficiently, by disposing the various recording areas, such as the shifted middle area and the flexible ODTA, in proper positions in the L0 layer and the L1 layer, by the information recording apparatus described later. Incidentally, the details of the recording operation will be discussed later.

Incidentally, according to the information recording medium shown in FIG. 5, it is an example when a predetermined margin is 80 μm in the case of a radius of 58.1 mm; however, it is also possible to set it to another value, for example, the predetermined margin can be 105 μm in the case of a radius of 58.6 mm. Here with reference to FIG. 15, another example when the predetermined margin is another value on the information recording medium of the present invention will be discussed. FIG. 15 shows an information recording medium when the predetermined margin is 105 μm. According to the information recording medium shown in FIG. 15, the recording area of the L0 layer is between an "F" point to a "G" point, under the above-mentioned opposite manner. Specifically, in the "F" point, the sector number is "030000h", the LPP address is "FFCFFFh", and the radial position is "24 mm". In the "G" point, the sector number is "22EF5Fh", the LPP address is "FDD10Ah", and the radial position is a variable "R0" μm. Incidentally, the most outer circumferential position "G" point of the data area of the L0 layer constitutes another example of the "point shown by the end address of the L1 layer" in the present invention.

On the other hand, the recording area of the L1 layer is between an "H" point to an "I" point, under the above-mentioned opposite manner. Specifically, the "H" point corresponds to the "G" point in the opposite manner. In the "H" point, the sector number is "DD10A0h", the LPP address is "022EF5h", and the radial position is a variable "R1" μm. Incidentally, the most outer circumferential position "H" point of the data area of the L1 layer constitutes another example of the "point shown by the start address of the L1 layer" in the present invention. In the "I" point, the radial position is set to be "24.105 mm" to reduce the recording area of the L1 layer by a predetermined margin of 105 μm, for example. Due to the setting of the radial position, the sector number is "FCCD5Fh", and the LPP address is "00332Ah".

In particular, as described above on the two-layer type optical disc in the embodiment, the offset information about the offset amount (discrepancy amount) is pre-recorded in the above-mentioned control data zone CDZ, wherein the offset amount (discrepancy amount) indicates a difference in the radial position between the most outer circumferential position "G" point of the data area in the L0 layer and the most outer circumferential position "H" point of the data area in the L1 layer as discussed above. The "offset information" in the embodiment herein is an address offset value converted by a predetermined linear function in order to uniquely determine it in accordance with the offset amount (discrepancy amount). More specifically, as shown in FIG. 6, a correlation between the offset amount (discrepancy amount) (variable "x: R0-R1") and the address offset value (variable "α") is expressed by the above-mentioned equation (1) which is a predetermined linear function.

Therefore, the difference in the radial position between the "G" point and the "H" point, "R0-R1" μm, is substituted into the variable "x", and the address offset value is indicated by the variable "α" which indicates the calculation result. The calculated address offset value is obtained or calculated by the information recording apparatus described later, and on the basis of the address offset value, the proper addresses of the recording start position and the recording end position in the L1 layer are calculated. Incidentally, the address offset value may be shown by a unit of sector number, or by a unit of one ECC block (=16 sectors). More specifically, if the offset amount (discrepancy amount) is 105 μm in the case of a radius of 58.6 mm, the offset amount (discrepancy amount) is 105.8 μm in the case of a radius of 58.1 mm. Then, "α=9184(sectors)" if "x=105.8" is substituted into the equation (1), "α=574 (ECC blocks)" by the unit of one ECC block (16 sectors), and "α=23Eh (ECC blocks)" by the hexadecimal numeral.

(2) First Embodiment of Information Recording Apparatus

Next, with reference to FIG. 7 to FIG. 10, the structure and operation of the information recording/reproducing apparatus in the first embodiment of the information recording apparatus of the present invention will be discussed in detail. In particular, the first embodiment is an example in which the information recording apparatus of the present invention is applied to an information recording/reproducing apparatus for the optical disc.

(2-1) Basic Structure

At first, with reference to FIG. 7, the basic structure of an information/reproducing apparatus 300 in the embodiment of the information recording apparatus of the present invention, and a host computer 400 will be discussed. FIG. 7 is a block diagram showing the information recording/reproducing apparatus in the embodiment of the information recording apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 7, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 305 for the drive.

The information recording/reproducing apparatus 300 is provided with: the optical disc 100; an optical pickup 301; a signal recording/reproducing device 302; an address detection device 303; an address operation device 304; the CPU (drive control device) 305; a spindle motor 306; a memory 307; a data input/output control device 308; and a bus 309.

The host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by containing the host computer having a communication device, such as a modem, in the same housing. Alternatively, the CPU (host control device) 401 of the host computer 400 having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the CPU 305, upon an OPC process. In particular, the signal recording/reproducing device 302 constitutes one example of the "writing device", together with the optical pickup 301.

The address detection device 303 detects an address (address information) on the optical disc 100, from a reproduction signal, including a pre-format address signal or the like and outputted by the signal recording/reproducing device 302. Moreover, the address detection device 303 may be constructed to detect the offset information pre-recorded in the control data zone. Thus, the address detection device 303 constitutes one example of he "obtaining device" of the present invention.

The address operation device 304 performs an operation or calculation, such as adding or subtracting the address offset value, with respect to the detected address. In particular, the address operation device 304 constitutes one example of the "calculating" of the present invention.

The CPU (drive control device) 305 controls the entire information recording/reproducing apparatus 300 by giving an instruction to various controlling devices, through the bus 357. In particular, the CPU 305 determines the location of various recording areas, on the basis of the address operated or calculated by the address operation device 304. Then, the CPU 305 controls the signal recording/reproducing device 302 to record various record information into the determined various recording areas. Moreover, software or firmware for operating the CPU 305 is stored in the memory 307. In particular, the CPU 305 is one specific example of the "controlling device" and the "judging device" of the present invention.

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the whole data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like. In particular, the above-mentioned offset amount (discrepancy amount), and the offset information about the address offset value or the like calculated on the basis of the offset amount (discrepancy amount) may be stored (memorized) in the memory 307. Incidentally, one example of the "storing device" of the present invention is constructed from the memory 307.

The data input/output control device 308 controls the input/output of the data from the exterior with respect to the information recording/reproducing apparatus 300, to thereby perform storage to and export from the data buffer on the memory 307. A drive control command issued from the external host computer 400 (hereinafter referred to as a "host", as occasion demands) connected to the information recording/reproducing apparatus 300 through an interface, such as a SCSI and an ATAPI, is transmitted to the CPU 305 through the data input/output control device 308. Moreover, the record/reproduction data is also transmitted and received with respect to the host computer 400 through the data input/output control device 308, in the same manner.

The CPU (host control device) 401, the memory 402, the data input/output control device 406, and the bus 407 in the host computer 400 are substantially the same as the corresponding constitutional elements in the information recording/reproducing apparatus 300.

In particular, the operation control device 403 receives an operation instruction and performs display with respect to the host computer 400, and transmits an instruction by the operation button 404, such as an instruction to record or reproduce, to the CPU 401. The CPU 401 may transmit a control command to the information recording/reproducing apparatus 300, through the data input/output control device 406, on the basis of instruction information from the operation control device 403, to thereby control the entire information recording/reproducing apparatus 300. In the same manner, the CPU 401 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can e recognized, so that the CPU 401 can output the operational state of the information recording/reproducing apparatus 300 to the display panel 405, such as a fluorescent tube and an LCD, through the operation control device 403.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control device 308 (406), such as the SCSI and the ATAPI, and application, such as writing software, installed in the host computer controls the disc drive.

(2-2) Operation Principle

Next, with reference to FIG. 8 to FIG. 10, and the above-mentioned FIG. 6 and FIG. 7, as occasion demands, the operation principle of the information recording/reproducing apparatus in the first embodiment of the information recording apparatus of the present invention will be discussed. FIG. 8 is a flowchart showing a recording operation of recording a shifted middle area etc. and an area ensuring operation of ensuring or reserving a flexible ODTA etc., performed by the information recording/reproducing apparatus in the first embodiment of the information recording apparatus of the present invention. FIG. 9 is a schematic diagram showing the principle of the recording operation of recording the shifted middle area etc. and the area ensuring operation of ensuring or reserving the flexible ODTA etc., performed by the information recording/reproducing apparatus in the first embodiment of the information recording apparatus of the present invention. FIG. 10 is a schematic diagram conceptually showing the principle of calculation of an address which properly indicates a predetermined point (or last address point) in the L1 layer corresponding to a predetermined point (or first address point) in the L0 layer, based on offset information, such as the above-mentioned address offset value "α", performed by the information recording/reproducing apparatus in the first embodiment of the information recording apparatus of the present invention.

As shown in FIG. 8, for example, in response to a finalize instruction to the optical disc 100, or an instruction to obtain an optimum recording laser power, the above-mentioned address detection device 303 detects the offset information pre-recorded in the control data zone, for example, as an initial operation, under the control of the CPU (drive control device) 305. At the same time, the address detection device 303 detects an address "X" of the most outer circumferential end of the data area 102-0 in the L0 layer, determined by the disc manufacturer (step S101).

Then, under the control of the CPU 305, the above-mentioned address operation device 304 calculates an address which indicates the inner circumferential end of the shifted middle area 104s-0 in the L0 layer shown in FIG. 9 (step S102). More specifically, in the Disc At Once recording manner or the like, the CPU 305 distributes the data amount of the information to be recorded, which is designated by a user, into the L0 layer and the L1 layer, and calculates an address "Y" of the outer circumferential end of the data area 102-0 into which the information is actually recorded in the L0 layer.

Back in FIG. 8, under the control of the CPU 305, the address operation device 304 calculates an address "Y'" which indicates the same radial position as the inner circumferential end of the shifted middle area 104s-0 in the L0 layer which is shown by the address "Y", in the L1 layer shown in FIG. 9 (step S103). Specifically, the address operation device 304 calculates the address "Y'" of the L1 layer, by performing a predetermined operation or calculation for the address "Y", which indicates the inner circumferential end of the shifted middle area 104s-0 in the L0 layer which is calculated in the step S102. The address "Y'" is calculated by the following equation (2).

$$Y'=\text{inv}(Y)-\alpha \qquad (2)$$

Incidentally, "inv" is a function for performing a complement operation.

In general, as shown in FIG. 10, an address which properly indicates a predetermined point in the L1 layer corresponding to a predetermined point in the L0 layer is calculated on the basis of the above-mentioned address offset value "α". More specifically, if the address of a sector number or the like corresponding to a radial position "R1a" (mm: millimeter) in the L0 layer is "X1", an address "X1'" corresponding to a radial position "R1a" (mm) in the L1 layer is calculated by the following equation (3).

$$X1'=\text{inv}(X1)-\alpha \qquad (3)$$

The equation (3) also holds true in a radial position "R2a" (mm) located on the outer circumferential side of the radial position "R1a" (mm), for example. Thus, if an address corresponding to the radial position "R2a" (mm) in the L0 layer is "X2", an address "X2'" corresponding to the radial position "R2a" (mm) in the L1 layer is calculated by the following equation (4).

$$X2'=\text{inv}(X2)-\alpha \quad (4)$$

Incidentally, the "α" in the equations (2) to (4) may be a fixed address offset value, as explained in FIG. 6, or may be a variable address offset value which is variable depending on the radial position by simulation or the like, for example.

Back in FIG. 8 again, under the control of the CPU 305, it is judged whether or not it is possible to dispose the shifted middle area 104s-0 (104s-1) and the flexible ODTA 107f-0 (107f-1) (steps S104). Specifically, as shown in FIG. 9, it is judged whether or not an address which indicates the outer circumferential end of the flexible ODTA 107f-0 (107f-1) is superimposed on an address which indicates the inner circumferential end of the fixed middle area 104-0 (104-1). More specifically, an address "Z" which indicates the outer circumferential end of the flexible ODTA 107f-1 in the L1 layer is calculated by the following equation (5).

$$Z'=\text{inv}(Y)-\alpha-\beta-\gamma \quad (5)$$

Incidentally, the "β" indicates the number of sectors corresponding to the data amount of the shifted middle area 104s-0 in the L0 layer. More specifically, 2 (KB: Kilo Byte) can be converted to 1 sector. Alternatively, 32 (KB) can be converted to 1 ECC block. Moreover, the "γ" indicates the number of sectors corresponding to the data amount of the flexible ODTA 107f-0 (107f-1) in the L0 layer or the L1 layer.

On the other hand, an address which indicates the outer circumferential end of the data area 102-1 in the L1 layer is a complement number of the address "X" of the most outer circumferential end of the data area 102-0 in the L0 layer, determined by the disc manufacturer, for example, which is detected in the step S101, so that the address is calculated by the following equation (6).

$$\text{Inv}(X) \quad (6)$$

Incidentally, the outer circumferential end of the data area 102-1 in the L1 layer is adjacent to the inner circumferential end of the fixed middle area 104-1, so that the addresses of the both may be regarded as almost or completely the same.

Consequently, a condition not to superimpose the address which indicates the outer circumferential end of the flexible ODTA 107f-1 in the L1 layer on the address which indicates the inner circumferential end of the fixed middle area 104-1 is shown by the following equation (7).

$$\text{inv}(Y)-\alpha-\beta-\gamma \geq \text{Inv}(X) \quad (7)$$

In the same manner, a condition not to superimpose the address which indicates the outer circumferential end of the flexible ODTA 107f-0 in the L1 layer on the address which indicates the inner circumferential end of the middle area 104-1 is shown by the following equation (8).

$$Y+\beta+\gamma \leq X-\alpha \quad (8)$$

Incidentally, the equation (7) and the equation (8) mean the same condition if two straight lines which indicate the addresses in the L0 layer and the L1 layer in FIG. 9 have the same slope. Moreover, even if the address is shown by the ECC block instead of the sector number, it is obviously possible to derive a conditional equation by the same algorithm.

More specifically, if the above-mentioned "α=1B2h (expressed in the hexadecimal numeral)", "β=440h", and "γ=444h" are substituted, the following equation (7a) and equation (8a) are obtained.

$$\text{inv}(Y)-A36h \geq \text{Inv}(X) \quad (7a)$$

$$Y+A36h \leq X \quad (8a)$$

Back in FIG. 8 again, as a result of the judgment in the step S104, if it is possible to dispose the shifted middle area 104s-0 (104s-1) and the flexible ODTA 107f-0 (107f-1), under the control of the CPU 305, namely, if the condition shown by the equation (8) is satisfied (the step S104: Yes), the buffer data is recorded in the shifted middle area 104s-0 (step S105). More specifically, in the L0 layer, the shifted middle area 104s-0 is formed from an address "Y+1" to an address "Y+β=Y+440h". On the other hand, in the L1 layer, the shifted middle area 104s-1 is formed from an address "Inv(Y)−1" to an address "Inv(Y)−α−β=Inv(Y)−5F2". As described above, the address which indicates the inner circumferential end of the shifted middle area 104s-1 in the L1 layer is a complement number of the address which indicates the inner circumferential end of the shifted middle area 104s-0 in the L0 layer. Moreover, the radial positions are set to be the same on the outer circumferential end of the shifted middle areas 104s-0 and 104s-1 in the L1 layer and the L1 layer.

Then, an area of the flexible ODTA 107f-0 (107f-1) is ensured (step S106). More specifically, in the L0 layer, an area of the flexible ODTA 107f-0 is ensured in an address "Y+β+1=Y+441h" to an address "Y+β+γ=Y+884h". On the other hand, in the L1 layer, the flexible ODTA 107f-1 is ensured in an address "Inv(Y)−α−β−1=Inv(Y)−5F3h" to an address "Inv(Y)−α−β−γ=Inv(Y)−A36h". As described above, the radial positions are set to be substantially and respectively the same between (i) on the inner and outer circumferential ends of the flexible ODTA 107f-0 in the L0 layer and (ii) on the inner and outer circumferential ends of the flexible ODTA 107f-1 in the L1 layer.

After the paragraph explaining the above-mentioned equations (7a) and (8a), the embodiment is shown if the predetermined margin is 80 μm. In the embodiment when the predetermined margin is 105 μm, more specifically, if the above-mentioned "α=23Eh", "β=440h", and "γ=443h" are substituted, the following equation (7b) and equation (8b) are obtained.

$$\text{inv}(Y)-AC1h \geq \text{Inv}(X) \quad (7b)$$

$$Y+AC1h- \leq X \quad (8b)$$

Here back in FIG. 8 again, as a result of the judgment in the step S104, if it is possible to dispose the shifted middle area 104s-0 (104s-1) and the flexible ODTA 107f-0 (107f-1), under the control of the CPU 305, namely, if the condition shown by the equation (8) is satisfied (the step S104: Yes), the buffer data is recorded in the shifted middle area 104s-0 (step S105). More specifically, in the L0 layer, the shifted middle area 104s-0 is formed from an address "Y+1" to an address "Y+β=Y+440h". On the other hand, in the L1 layer, the shifted middle area 104s-1 is formed from an address "Inv(Y)−1" to an address "Inv(Y)−α−β=Inv(Y)−67E". As described above, the address which indicates the inner circumferential end of the shifted middle area 104s-1 in the L1 layer is a complement number of the address which indicates the inner circumferential end of the shifted middle area 104s-0 in the L0 layer. Moreover, the radial positions are set to be the same on the outer circumferential end of the shifted middle areas 104s-0 and 104s-1 in the L1 layer and the L1 layer.

Then, an area of the flexible ODTA 107f-0 (107f-1) is ensured (step S106). More specifically, in the L0 layer, an area of the flexible ODTA 107*f*-0 is ensured in an address "Y+β+1=Y+441h" to an address "Y+β+γ=Y+883h". On the other hand, in the L1 layer, the flexible ODTA 107*f*-1 is formed from an address "Inv(Y)–α–β–1=Inv(Y)–67Fh" to an address "Inv(Y)–α–β–γ=Inv(Y)–AC1h". As described above, the radial positions are set to be substantially the same on the inner and outer circumferential ends of the flexible ODTA 107*f*-0 in the L0 layer and on the inner and outer circumferential ends of the flexible ODTA 107*f*-1 in the L1 layer.

On the other hand, as a result of the judgment in the step S104, if it is not possible to dispose the shifted middle area 104*s*-0 (104*s*-1) and the flexible ODTA 107*f*-0 (107*f*-1), under the control of the CPU 305, namely, if the condition shown by the equation (8) is not satisfied (the step S104: No), the buffer data is recorded in the middle area 104-0 (104-1) (step S107). More specifically, in the L0 layer, the middle area 104-0 is formed from an address "X+1" to an address "X+β". On the other hand, in the L1 layer, the middle area 104-1 is formed from an address "Inv(X)–1" to an address "Inv(X)–α–β". Incidentally, if the middle area 104-0 (104-1) is formed in advance, by embossed pits and an irradiation of laser light or the like, for example, the step S107 may be omitted.

Then, an area of the ODTA 107-0 (107-1) is ensured (step S108). More specifically, in the L0 layer, an area of the ODTA 107-0 is ensured in an address "X+β+1" to an address "X+β+γ". On the other hand, in the L1 layer, the ODTA 107-1 is ensured in an address "Inv(X)–α–β–1" to an address "Inv(X)–α–β–γ". Incidentally, if the ODTA 107-0 (107-1) is ensured in advance the step S108 may be omitted.

Consequently, according to the information recording/reproducing apparatus in the embodiment, the relationship between the address and the radial position in the L0 layer and the L1 layer is accurately known on the basis of the offset information. Therefore, it is possible to realize the recording operation and the area ensuring operation, more accurately and efficiently, by disposing the various recording areas, such as the shifted middle area and the flexible ODTA, in proper positions in the L0 layer and the L1 layer, by the information recording/reproducing apparatus.

Moreover, it is unnecessary to perform complicated control in order to determine the areas of the shifted middle area and the flexible ODTA. As a result, it is also possible to reduce a time length required for the recording operation performed by the information recording/reproducing apparatus. In addition, it is possible to determine the location, more simply, in order not to superimpose the shifted middle area and the flexible ODTA on the fixed middle area and ODTA.

(3) Study of Operation and Effect of Information Recording Medium and Information Recording Apparatus of the Present Invention Next, with reference to FIG. 11 and FIG. 12, consideration will be given to the operation and effect of the information recording medium and the information recording apparatus of the present invention. FIG. 11 is a schematic diagram showing a difference between a first predetermined position in the L0 layer and a second predetermine position in the L1 layer corresponding to the address of the first predetermined position, in two information recording media in a comparison example. FIG. 12 is a schematic diagram showing the principle of the recording operation of recording the shifted middle area and the area ensuring operation of ensuring or reserving the flexible ODTA, performed by an information recording/reproducing apparatus in the comparison example.

As shown in FIG. 11, a difference between the first predetermined position in the L0 layer and the second predetermine position in the L1 layer corresponding to the address of the first predetermined position varies depending on the manufacturer of the optical disc, the type of the optical disc, or the optical disc individual. More specifically, for example, the radial position shown by the address "Inv(X)" in the L1 layer, which is associated, by the complement relationship, with the address "X" in the L0 layer, is "R'" in the case of a disc maker A, and "R''" in the case of a disc maker B. Therefore, if the information recording/reproducing apparatus properly performs the recording operation and the like, on the basis of the offset information corresponding to the radial position "R'" in the case of the disc maker B, the relationship between the address and the radial position is not accurately known with respect to the optical disc made by the disc maker A. Thus, as shown in FIG. 12, on the information recording/reproducing apparatus in the comparison example, there is a possibility that the address which indicates the outer circumferential end of the flexible ODTA 107*f*-0 in the L0 layer is superimposed on the address which indicates the inner circumferential end of the middle area 104-1.

As opposed to this, according to the present invention, the relationship between the address and the radial position in the L0 layer and the L1 layer is accurately known on the basis of the offset information. Therefore, it is possible to realize the recording operation and the area ensuring operation, more accurately and efficiently, by disposing the various recording areas, such as the shifted middle area and the flexible ODTA, in proper positions in the L1 layer and the L1 layer, by the information recording/reproducing apparatus.

(4) Second Embodiment of Information Recording Apparatus (4-1) Operation Principle Next, with reference to FIG. 13 and FIG. 14, the operation principle of the information recording/reproducing apparatus in a second embodiment of the information recording apparatus of the present invention will be discussed. Incidentally, the basic structure of the information recording/reproducing apparatus in the second embodiment is substantially the same as in the first embodiment. FIG. 13 is a flowchart showing the recording operation of recording the shifted middle area etc. and the area ensuring operation of ensuring or reserving the flexible ODTA etc., performed by the information recording/reproducing apparatus in the second embodiment of the information recording apparatus of the present invention. FIG. 14 is a schematic diagram showing the principle of the recording operation of recording the shifted middle area and the area ensuring operation of ensuring or reserving the flexible ODTA, performed by the information recording/reproducing apparatus in the second embodiment of the information recording apparatus of the present invention.

As shown in FIG. 13, as a result of the above-mentioned step S104, if it is possible to dispose the shifted middle area 104*s*-0 (104*s*-1) and the flexible ODTA 107*f*-0 (107*f*-1), under the control of the CPU 305, namely, if the condition shown by the equation (8) is satisfied (the step S104: Yes), further, a data amount is calculated wherein the data amount corresponds to a space area existing between the middle area 104-0 (104-1) and an area where the shifted middle area 104*s*-0 (104*s*-1) and the flexible ODTA 107*f*-0 (107*f*-1) are disposed (step S201).

Then, the buffer data increased in the shifted middle area 104*s*-0 (104*s*-1) on the basis of the data amount corresponding to the space area calculated in the step S201 is recorded (step S202). More specifically, in the L0 layer, the shifted middle area 104s-0 is formed from an address "Y+1" to an address "Y+β+β'". In particular, the "β'" is a value obtained by converting one portion of the data mount corresponding to the space area to the address of the sector number or the like, for example. Incidentally, the "β'" may be set to "0: zero", and a data amount corresponding to the "β'" may be assigned or allocated to the flexible ODTA 107f-0 (107f-1) described later. On the other hand, in the L1 layer, the shifted middle area 104s-1 is formed from an address "Inv(Y)−1" to an address "Inv(Y)−α−β−β'".

Then, an area of the flexible ODTA 107f-0 (107f-1), expanded on the basis of the data amount corresponding to the space area calculated in the step S201, is ensured (step S203). More specifically, in the L0 layer, an area of the expanded flexible ODTA 107f-0 is ensured in an address "Y+β+β'+1" to an address "Y+β+β'+γ+γ'". On the other hand, in the L1 layer, the expanded flexible ODTA 107f-1 is formed from an address "Inv(Y)−α−β−β'−1" to an address "Inv(Y)−α−β−β'γ−γ'".

Consequently, according to the information recording/reproducing apparatus in the second embodiment, it is possible to dispose the various recording areas, such as the shifted middle area and the flexible ODTA, in proper positions in the L0 layer and the L1 layer. It is also possible to adjust the size (data amount) of the various recording areas. Therefore, it is possible to eliminate the waste of the recording area, to thereby realize the recording operation and the area ensuring operation, more efficiently.

Specifically, if the area of the shifted middle area is expanded, it is possible to stabilize the recording/reproduction operation of the optical pickup of the information recording apparatus (disc drive). On the other hand, if the area of the flexible ODTA is expanded, it is possible to perform the power calibration, more often, to determine the optimum recording power. Thus, it is possible to make the recording operation of the information recording apparatus (disc drive) more stable.

In the embodiments, the write-once or rewritable type optical disc, such as a two-layer type DVD-R or DVD+R, and DVD-RW or DVD+RW, is explained, as one example of the information recording medium. The present invention, however, can be applied to a multiple layer type optical disc, such as a three-layer type. Moreover, it can be applied to a large-capacity recording medium, such as a disc which uses blue laser for recording/reproduction.

Furthermore, in the embodiments, the information recording/reproducing apparatus for additional recording or writing once, such as a DVD-R recorder and a DVD+R recorder, is explained as one example of the information recording apparatus. The present invention, however, can be applied to an information recording/reproducing apparatus for rewriting, such as a multiple layer type optical disc, such as a DVD-R recorder and a DVD+R recorder. Moreover, it can be applied to an information recording/reproducing apparatus for large-capacity recording, which uses blue laser for The present invention is not limited to the above-described embodiments, and various changes may be made, if desired, without departing from the essence or spirit of the invention which can be read from the claims and the entire specification. An information recording apparatus, an information recording method, and a computer program, which involve such changes, are also intended to be within the technical scope of the present invention.

INDUSTRIAL APPLICABILITY

The information recording apparatus, the information recording method, and the computer program for recording control of the present invention can be applied to an information recording apparatus, such as a DVD recorder. Moreover, they can be applied to an information recording apparatus or the like, which is mounted on or can be connected to various computer equipment for consumer or industrial use, for example.

The invention claimed is:

1. An information recording apparatus for recording record information onto an information recording medium comprising at least: a first recording layer in which a first recording area can be formed, and a second recording layer which has a relative discrepancy with the first recording layer in a radial direction and in which a second recording area can be formed, said information recording apparatus comprising:
a writing device capable of writing the record information into the first recording layer and the second recording layer;
an obtaining device for obtaining offset information which indicates the relative discrepancy;
a calculating device for calculating an address which indicates a second border point of the second recording area facing a first border point of the first recording area, on the basis of the obtained offset information; and
a controlling device for controlling said writing device to write the record information (i) to form the first recording area, with the first border point as a recording end position or a recording start position, and (ii) to form the second recording area, with the second border point which is indicated by the calculated address as a recording end position or a recording start position.

2. The information recording apparatus according to claim 1, wherein
said information recording medium further comprises a management area to record therein the offset information corresponding to said information recording medium,
said obtaining device obtains the offset information by reading the offset information from the management area, and
said calculating device calculates the address which indicates the second border point, on the basis of the obtained offset information.

3. The information recording apparatus according to claim 1, further comprising a storing device for storing the offset information corresponding to said information recording medium,
said calculating device calculating the address which indicates the second border point, on the basis of the stored offset information.

4. The information recording apparatus according to claim 1, wherein
said information recording medium comprises, as the first recording area and the second recording area:
at least one of
(i) a data area to record therein the record information;
(ii) a fixed buffer area in which a radial position is fixed, which is formed by recording buffer data which is at least one portion of the record data, and which is to prevent a recording or reproduction position with respect to the first recording layer and the second recording layer from deviating to an unrecorded area; and (iii) a variable buffer area which is located on an inner circumferential side of the fixed buffer area, which can be located adjacently to the data area, and which is variable-length, and which is to prevent the recording or reproduction position from deviating to the unrecorded area, said calculating device calculates an address which indicates a second outer circumferential end of the variable or fixed buffer area in the second recording layer, facing a first outer circumferential end of the variable or fixed buffer area in the first recording layer, on the basis of the obtained offset information and a data amount of the variable or fixed buffer area, and said controlling device controls said writing device to write the buffer data until the first outer circumferential end, as well as from the second outer circumferential end, in response to a finalize instruction to said information recording medium.

5. The information recording apparatus according to claim 1, wherein said information recording medium comprises, as the first recording area and the second recording area:

at least one of (iv) a fixed calibration area in which a radial position is fixed, and in which data for test writing, which is one portion of the record information, can be recorded in order to obtain an optimum recording power of laser light for recording; and (v) a variable calibration area which is located on an inner circumferential side of the fixed calibration area, which can be located adjacently to the data area, and which is variable-length, and in which the data for test writing can be recorded said calculating device calculates an address which indicates a second inner circumferential end of the variable or fixed calibration area in the second recording layer, facing a first inner circumferential end of the variable or fixed calibration area in the first recording layer, and calculates an address which indicates a fourth outer circumferential end of the variable or fixed calibration area in the second recording layer, facing a third outer circumferential end of the variable or fixed calibration area in the first recording layer, on the basis of the obtained offset information and a data amount of the variable or fixed calibration area, and said controlling device controls said writing device to write the data for test writing into a section from the first inner circumferential end to the third outer circumferential end, as well as into a section from the second inner circumferential end to the fourth outer circumferential end, in response to an instruction for obtaining the optimum recording power to said information recording medium.

6. The information recording apparatus according to claim 4, wherein said controlling device controls said writing device to write the record information while the variable or fixed calibration area is located on an outer circumferential side of the variable or fixed buffer area.

7. The information recording apparatus according to claim 6, further comprising a judging device for judging whether or not the outer circumferential end of variable calibration area can be located on an inner circumferential side of the inner circumferential end of the fixed buffer area, on the basis of the obtained offset information and the data amount of the variable buffer area and variable calibration area, said controlling device (i) controlling said writing device, to write the record information while the variable buffer area and the variable calibration area are located on the inner circumferential side of the fixed buffer area and the fixed calibration area if it is judged that the outer circumferential end of variable calibration area can be located by said judging device, and (ii) controlling not to dispose the variable buffer area and the variable calibration area if it is not judged that the outer circumferential end of variable calibration area can be located.

8. The information recording apparatus according to claim 7, further comprising a spare capacity calculating device for calculating a spare capacity of a space area from the outer circumferential end of the variable calibration area to the inner circumferential end of the fixed buffer area, said controlling device controlling said writing device to write the record information while (i) one portion of the calculated spare capacity is distributed into the variable buffer area, and (ii) another portion of the calculated spare capacity is distributed into the variable calibration area.

9. The information recording apparatus according to claim 4, wherein said controlling device controls said writing device to write the buffer data while the inner circumferential end of the variable or fixed buffer area in the second recording layer is located on the inner circumferential side of the inner circumferential end of the variable or fixed buffer area in the first recording area.

10. An information recording method in an information recording apparatus comprising a writing device capable of writing record information into a first recording layer and a second recording layer, onto an information recording medium comprising at least: the first recording layer in which a first recording area can be formed, and the second recording layer which has a relative discrepancy with the first recording layer in a radial direction and in which a second recording area can be formed, said information recording method comprising:

an obtaining process of obtaining offset information which indicates the relative discrepancy;

a calculating process of calculating an address which indicates a second border point of the second recording area facing a first border point of the first recording area, on the basis of the obtained offset information; and a controlling process of controlling said writing device to write the record information (i) to form the first recording area, with the first border point as a recording end position or a recording start position, and (ii) to form the second recording area, with the second border point which is indicated by the calculated address as a recording end position or a recording start position.

11. A computer readable recording medium recording thereon a computer program of instructions executable by a computer provided for an information recording apparatus, said computer program making the computer function as at least one of a writing device, a obtaining device, a calculating device, and a controlling device, said information recording apparatus for recording record information onto an information recording medium comprising at least: a first recording layer in which a first recording area can be formed, and a second recording layer which has a relative discrepancy with the first recording layer in a radial direction and in which a second recording area can be formed, said information recording apparatus comprising:
- said writing device capable of writing the record information into the first recording layer and the second recording layer;
- said obtaining device for obtaining offset information which indicates the relative discrepancy;
- said calculating device for calculating an address which indicates a second border point of the second recording area facing a first border point of the first recording area, on the basis of the obtained offset information; and
- said controlling device for controlling said writing device to write the record information (i) to form the first recording area, with the first border point as a recording end position or a recording start position, and (ii) to form the second recording area, with the second border point which is indicated by the calculated address as a recording end position or a recording start position.

12. An information recording apparatus for recording buffer data onto an information recording medium comprising at least: a first recording layer in which a first shifted middle area can be formed, and a second recording layer which has a relative discrepancy with the first recording layer in a radial direction and in which a second shifted middle area can be formed, said information recording apparatus comprising:
- a writing device capable of writing the buffer data into the first recording layer and the second recording layer;
- an obtaining device for obtaining offset information which indicates the relative discrepancy;
- a calculating device for calculating an address which indicates a second border point of the second shifted middle area facing a first border point of the first shifted middle area, on the basis of the obtained offset information; and
- a controlling device for controlling said writing device to write the buffer data (i) to form the first shifted middle area, with the first border point as an outer circumferential end, and (ii) to form the second shifted middle area, with the second border point which is indicated by the calculated address as an outer circumferential end.

13. An information recording method in an information recording apparatus comprising a writing device capable of writing buffer data into a first recording layer and a second recording layer, onto an information recording medium comprising at least: the first recording layer in which a first shifted middle area can be formed, and the second recording layer which has a relative discrepancy with the first recording layer in a radial direction and in which a second shifted middle area can be formed, said information recording method comprising:
- an obtaining process of obtaining offset information which indicates the relative discrepancy;
- a calculating process of calculating an address which indicates a second border point of the second shifted middle area facing a first border point of the first shifted middle area, on the basis of the obtained offset information; and
- a controlling process of controlling said writing device to write the buffer data (i) to form the first shifted middle area, with the first border point as an outer circumferential end, and (ii) to form the second shifted middle area, with the second border point which is indicated by the calculated address as an outer circumferential end.

14. An information recording apparatus for recording an OPC (Optimum Power Control) pattern onto an information recording medium comprising at least: a first recording layer in which a first flexible ODTA (Outer Disc Testing Area) can be formed, and a second recording layer which has a relative discrepancy with the first recording layer in a radial direction and in which a second flexible ODTA can be formed, said information recording apparatus comprising:
- a writing device capable of writing the OPC pattern into the first recording layer and the second recording layer;
- an obtaining device for obtaining offset information which indicates the relative discrepancy;
- a calculating device for calculating an address which indicates a second border point of the second flexible ODTA facing a first border point of the first flexible ODTA, on the basis of the obtained offset information; and
- a controlling device for controlling said writing device to write the OPC pattern (i) to form the first flexible ODTA, with the first border point as an outer circumferential end, and (ii) to form the second flexible ODTA, with the second border point which is indicated by the calculated address as an outer circumferential end.

15. An information recording method in an information recording apparatus comprising a writing device capable of writing an OPC (Optimum Power Control) pattern into a first recording layer and a second recording layer, onto an information recording medium comprising at least: the first recording layer in which a first flexible ODTA (Outer Disc Testing Area) can be formed, and the second recording layer which has a relative discrepancy with the first recording layer in a radial direction and in which a second flexible ODTA can be formed, said information recording method comprising:
- an obtaining process of obtaining offset information which indicates the relative discrepancy;
- a calculating process of calculating an address which indicates a second border point of the second flexible ODTA facing a first border point of the first flexible ODTA, on the basis of the obtained offset information; and
- a controlling process of controlling said writing device to write the OPC pattern (i) to form the first flexible ODTA, with the first border point as an outer circumferential end, and (ii) to form the second flexible ODTA, with the second border point which is indicated by the calculated address as an outer circumferential end.

* * * * *